(12) United States Patent
Kobayashi et al.

(10) Patent No.: US 9,419,318 B2
(45) Date of Patent: Aug. 16, 2016

(54) METHOD OF PRODUCING PHOTOELECTRIC CONVERSION ELEMENT, PHOTOELECTRIC CONVERSION ELEMENT AND PHOTOELECTROCHEMICAL CELL

(75) Inventors: Katsumi Kobayashi, Kanagawa (JP); Keizo Kimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 909 days.

(21) Appl. No.: 13/578,905

(22) PCT Filed: Mar. 22, 2011

(86) PCT No.: PCT/JP2011/056834
§ 371 (c)(1),
(2), (4) Date: Aug. 14, 2012

(87) PCT Pub. No.: WO2011/118581
PCT Pub. Date: Sep. 29, 2011

(65) Prior Publication Data
US 2012/0305905 A1 Dec. 6, 2012

(30) Foreign Application Priority Data

Mar. 24, 2010 (JP) ................................. 2010-068946

(51) Int. Cl.
| | | |
|---|---|---|
| H01L 51/48 | (2006.01) | |
| H01L 51/46 | (2006.01) | |
| H01M 14/00 | (2006.01) | |

(52) U.S. Cl.
CPC .................................. *H01M 14/005* (2013.01)

(58) Field of Classification Search
None
See application file for complete search history.

(56) References Cited

U.S. PATENT DOCUMENTS

| | | | |
|---|---|---|---|
| 5,463,057 A | 10/1995 | Graetzel et al. | |
| 2002/0015881 A1 | 2/2002 | Nakamura et al. | |

(Continued)

FOREIGN PATENT DOCUMENTS

| | | |
|---|---|---|
| JP | 2001-357896 | 12/2001 |
| JP | 2002-280587 | 9/2002 |

(Continued)

OTHER PUBLICATIONS

Machine translation of JP5,466,943.*

(Continued)

*Primary Examiner* — Ling Choi
*Assistant Examiner* — Catherine S Branch
(74) *Attorney, Agent, or Firm* — Young & Thompson

(57) ABSTRACT

A method of producing a photoelectric conversion element, which contains an electrically conductive support, a photosensitive layer having porous semiconductor fine particles that have adsorbed a dye formed on the support, a charge transfer layer; and a counter electrode; containing the steps of: applying a dispersion liquid, in which the content of solids excluding semiconductor fine particles is 1% by mass or less based on the total amount of the dispersion liquid, on the support, to form a coating; heating the coating, to obtain porous semiconductor fine particles; and sensitizing the porous semiconductor fine particles by a dye having a structure represented by Formula (1):

$$M(LL^1)m_1(LL^2)m_2(X)m_3 \cdot CI \qquad \text{Formula (1)}$$

wherein M represents a metal atom, $LL^1$, $LL^2$, and X each are a ligand, CI represents a counter ion, $m_1$ represents an integer of 1 to 3, $m_2$ and $m_3$ each represent an integer of 0 to 2.

17 Claims, 1 Drawing Sheet

(56) References Cited

U.S. PATENT DOCUMENTS

2003/0205268 A1 11/2003 Nakamura et al.
2006/0107994 A1 5/2006 Morooka et al.

FOREIGN PATENT DOCUMENTS

| JP | 2008-021496 | | 1/2008 |
|----|----|----|----|
| JP | 2009-067976 | | 4/2009 |
| JP | 2009-283347 | | 12/2009 |
| JP | 5466943 B2 | * | 4/2014 |
| WO | WO 2009/020098 | | 2/2009 |
| WO | WO 2009020098 A1 | * | 2/2009 |

OTHER PUBLICATIONS

JP Office Action dated Apr. 1, 2014, with English Translation; Application No. 2012-507010.

Extended European Search Report, dated Nov. 10, 2014, in corresponding European Patent Application No. 11759386.3.

Mozer, A., et al. "Efficient dye-sensitized solar cells based on a 2-thiophen-2-yl-conjugated ruthenium photosensitizer and a conjugated polymer hole conductor", Applied Physics Letters, American Institute of Physics, US, vol. 89, No. 4, Jul. 27, 2006, pp. 43509-043509.

Jiang, K., et al. "A novel ruthenium sensitizer with a hydrophobic 2-thiophen-2yl-vinyl-conjugated bipyridyl ligand for effective dye sensitized TiO2 solar cells", Chemical Communications, No. 23, Jan. 1, 206, p. 2460.

Jiang, K., et al. "Photovoltaics Based on Hybridization of Effective Dye-Sensitized Titanium Oxide and Hole-Condictive Polymer P3HT", Advanced Functional Materials, Wiley-V C H Verlag GmbH & Co. KGaA, De, vol. 19, No. 15, Aug. 10, 2009, pp. 2481-2485.

Noda, S., et al. "Development of large size dye-sensitized solar cell modules with high temperature durability", Synthetic Metals, Elsevier Sequoia, Lausanne, Ch, vol. 159, No. 21-22, Nov. 1, 2009, pp. 2355-2357.

International Search Report, PCT/JP2011/056834, Jul. 5, 2011.

Ke-Jian Jiang et al., Efficient sensitization of nanocrystalline TiO2 films with high molar extinction coeffcient ruthenium complex, Inorganica Chimica Acta, Feb. 15, 2008, vol. 361, Issue 3, 783-785.

* cited by examiner

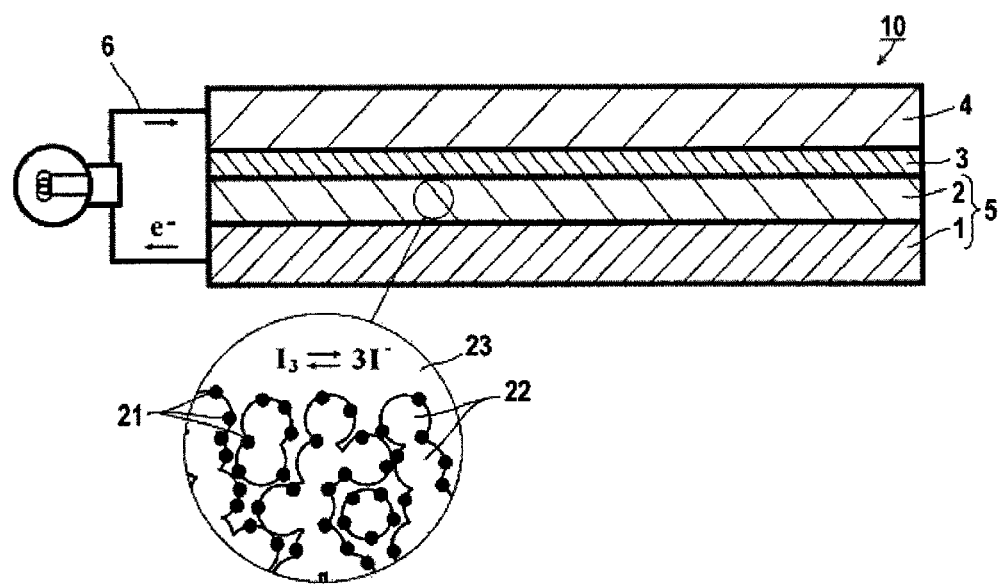

METHOD OF PRODUCING PHOTOELECTRIC CONVERSION ELEMENT, PHOTOELECTRIC CONVERSION ELEMENT AND PHOTOELECTROCHEMICAL CELL

TECHNICAL FIELD

The present invention relates to a method of producing a photoelectric conversion element which exhibits high conversion efficiency and excellent durability, a photoelectric conversion element, and a photoelectrochemical cell.

BACKGROUND ART

Photoelectric conversion elements are used in various photosensors, copying machines, solar cells, and the like. These photoelectric conversion elements have adopted various systems to be put into use, such as elements utilizing metals, elements utilizing semiconductors, elements utilizing organic pigments or dyes, or combinations of these elements. Among them, solar cells that make use of non-exhaustive solar energy do not necessitate fuels, and full-fledged practicalization of solar cells as an inexhaustible clean energy is being highly expected. Among these, research and development of silicon-based solar cells have long been in progress. Many countries also support policy-wise considerations, and thus dissemination of silicon-based solar cells is still in progress. However, silicon is an inorganic material, and has limitations per se in terms of throughput and molecular modification.

Under such circumstances, research is being vigorously carried out on dye-sensitized solar cells. Particularly, Graetzel et al. at l'Ecole Polytechnique de l'Universite de Lausanne in Switzerland have developed a dye-sensitized solar cell in which a dye formed from a ruthenium complex is fixed at the surface of a porous titanium oxide thin film, and have realized a conversion efficiency that is comparable to that of amorphous silicon. Thus, the dye-sensitized solar cells instantly attracted the attention of researchers all over the world.

Dye-sensitized photoelectric conversion elements making use of semiconductor fine particles sensitized by a ruthenium complex dye, to which the foregoing technology has been applied, are described (see, for example, Patent Literature 1). Generally, these photoelectric conversion elements using the semiconductor fine particles sensitized by a dye, such as a ruthenium complex dye, are produced by applying a high-viscosity dispersion liquid containing semiconductor fine particles on an electrode support, volatilizing the solvent contained in the applied dispersion liquid at a high temperature (e.g., 400° C. to 500° C.), and adsorbing a dye to the semiconductor fine particles. However, the time or energy consumed in this solvent volatilization process poses an obstruction to cost reduction in production of a photoelectric conversion element and a photoelectrochemical cell.

In regard to this problem, Patent Literature 2 describes a method of adsorbing a dye to semiconductor fine particles, by applying on a support a dispersion liquid in which the content of additives excluding semiconductor fine particles and dispersion solvent is 1% by mass or less of the dispersion liquid, and heating the dispersion liquid coating at 250° C. or below.

The photoelectric conversion element is required to have high initial conversion efficiency and both less reduction in conversion efficiency and excellent durability even after use. In terms of durability, however, it is not enough to produce the photoelectric conversion element using semiconductor fine particles simply sensitized with an ordinary dye in accordance with a method described in Patent Literature 2.

CITATION LIST

Patent Literatures

Patent Literature 1: U.S. Pat. No. 5,463,057
Patent Literature 2: JP-A-2002-280587 ("JP-A" means unexamined published Japanese patent application)

SUMMARY OF THE INVENTION

Technical Problem

The present invention resides in to provide a method of producing a photoelectric conversion element which exhibits high conversion efficiency and excellent durability, a photoelectric conversion element, and a photoelectrochemical cell.

Solution to Problem

The inventors of the present invention conducted thorough investigations, and as a result, they found that when a particular dispersion liquid of semiconductor fine particles is applied and dried on an electrically conductive support, and then the semiconductor fine particles are sensitized with a dye having a specific structure, a method of producing a photoelectric conversion element having high conversion efficiency and excellent durability, a photoelectric conversion element and a photoelectrochemical cell can be provided. The present invention was made based on this finding.

The problems of the present invention can be solved by the following means.

<1> A method of producing a photoelectric conversion element,
which the photoelectric conversion element comprises a laminated structure including:
  an electrically conductive support,
  a photosensitive layer having semiconductor fine particles that have adsorbed a dye, formed on the electrically conductive support;
  a charge transfer layer; and
  a counter electrode;
comprising the steps of:
  applying a semiconductor fine particle dispersion liquid, in which the content of solids excluding semiconductor fine particles is 1% by mass or less based on the total amount of the semiconductor fine particle dispersion liquid, on the electrically conductive support, to form a coating;
  heating the coating, to obtain porous semiconductor fine particles; and
  sensitizing the porous semiconductor fine particles by a dye having a structure represented by Formula (1):

$$M(LL^1)m_1(LL^2)m_2(X)m_3 \cdot CI \qquad \text{Formula (1)}$$

wherein
M represents a metal atom; $LL^1$ is a bidentate or terdentate ligand represented by Formula (2); $LL^2$ is a bidentate or terdentate ligand represented by Formula (3);
X represents a monodentate or bidentate ligand which coordinates through a group selected from the group consisting of an acyloxy group, an acylthio group, a thioacyloxy group, a thioacylthio group, an acylaminooxy group, a thiocarbamate group, a dithiocarbamate group, a thiocarbonate group, a dithiocarbonate group, a trithiocarbonate group, an acyl group, a thiocyanate group, an isothiocyanate group, a cyanate group, an isocyanate group, a cyano group, an alkylthio group, an arylthio group, an alkoxy group and an aryloxy group, or a monodentate or bidentate ligand composed of a halogen atom, a carbonyl, a dialkylketone, a 1,3-diketone, a carbonamide, a thiocarbonamide or a thiourea;

$m_1$ represents an integer of 1 to 3; when $m_1$ is an integer of 2 or more, $LL^1$'s may be the same or different from each other; $m_2$ represents an integer of 0 to 2; when $m_2$ is an integer of 2, $LL^2$'s may be the same or different from each other; $m_3$ represents an integer of 0 to 2; when $m_3$ is an integer of 2, X's may be the same or different from each other, or X's may be bonded to each other;

CI represents a counter ion in the case where the counter ion is necessary to neutralize a charge in Formula (1);

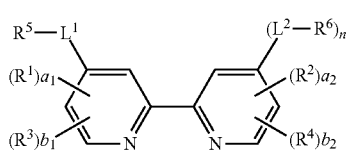

Formula (2)

wherein $R^1$ and $R^2$ each independently represent a carboxyl group, a sulfonic acid group, a hydroxyl group, a hydroxamic acid group, a phosphoryl group or a phosphonyl group; $R^3$ and $R^4$ each independently represent a substituent; $R^5$ and $R^6$ each independently represent an aryl group or a heterocyclic group;

$L^1$ and $L^2$ each independently represent a conjugated chain composed of a substituted or unsubstituted ethenylene group and/or ethynylene group;

$a_1$ and $a_2$ each independently represent an integer of 0 to 3; when $a_1$ is an integer of 2 or more, $R^1$'s may be the same or different from each other; when $a_2$ is an integer of 2 or more, $R^2$'s may be the same or different from each other; $b_1$ and $b_2$ each independently represent an integer of 0 to 3; when $b_1$ is an integer of 2 or more, $R^3$'s may be the same or different from each other, or $R^3$'s may be bonded to each other; when $b^2$ is an integer of 2 or more, $R^4$'s may be the same or different from each other, or $R^4$'s may be bonded to each other; when $b^1$ and $b^2$ each are 1, $R^3$ and $R^4$ may be bonded to each other to form a ring; and n represents 0 or 1; and

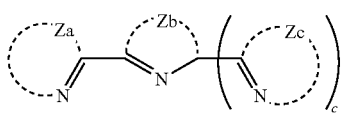

Formula (3)

wherein

Za, Zb and Zc each independently represent a group of non-metallic atoms for forming a 5- or 6-membered ring; and c represents 0 or 1.

<2> The method of producing a photoelectric conversion element described in the above item <1>, wherein the electrically conductive support is formed of a polymeric material.

<3> The method of producing a photoelectric conversion element described in the above item <1> or <2>, wherein the electrically conductive support applied with the semiconductor fine particle dispersion liquid is heated at a temperature ranging from 100° C. to 250° C. in the step for obtaining the porous semiconductor fine particles.

<4> The method of producing a photoelectric conversion element described in any one of the above items <1> to <3>, wherein M is Ru, Fe, Os or Cu.

<5> The method of producing a photoelectric conversion element described in any one of the above items <1> to <4>, wherein M is Ru.

<6> The method of producing a photoelectric conversion element described in any one of the above items <1> to <5>, wherein $R^5$ and $R^6$ each are a heterocyclic group or a carbocyclic aromatic group condensed with a heterocyclic group.

<7> The method of producing a photoelectric conversion element described in the above item <6>, wherein the heterocyclic group comprises a thiophene ring, a pyrrol ring or a furan ring.

<8> The method of producing a photoelectric conversion element described in the above item <6> or <7>, wherein $R^5$ and $R^6$ each are a heterocyclic group substituted with an aliphatic group or an alkoxy group, or a carbocyclic aromatic group condensed with a heterocyclic group.

<9> The method of producing a photoelectric conversion element described in any one of the above items <6> to <8>, wherein $R^5$ or $R^6$ comprises plural heterocyclic rings.

<10> A photoelectric conversion element, which is produced by the method described in any one of the above items <1> to <9>.

<11> A photoelectrochemical cell, comprising the photoelectric conversion element described in the above item <10>.

Advantageous Effects of Invention

When the porous semiconductor fine particle layer prepared according to the production method of the present invention is used in a photosensitive layer, a photoelectric conversion element which exhibits high conversion efficiency and excellent durability can be produced by a low-cost means.

Further, the present invention enables to provide a photoelectric conversion element and a photoelectrochemical cell which exhibit high conversion efficiency and excellent durability.

Other and further features and advantages of the invention will appear more fully from the following description, appropriately referring to the accompanying drawing.

BRIEF DESCRIPTION OF THE DRAWING

FIG. 1 is a cross-sectional view schematically showing an exemplary embodiment of the photoelectric conversion element produced by the production method according to the present invention.

MODE FOR CARRYING OUT THE INVENTION

The present invention resides in a method of producing a photoelectric conversion element composed of a laminated structure including: an electrically conductive support, a photosensitive layer containing porous semiconductor fine particles that have adsorbed a dye, formed on the electrically conductive support; a charge transfer layer; and a counter electrode; the method including: the step of applying a semiconductor fine particle dispersion liquid, in which the content of solids excluding semiconductor fine particles is 1% by mass or less based on the total amount of the semiconductor fine particle dispersion liquid, on the electrically conductive support, to form a coating and then heating the coating to obtain porous semiconductor fine particles; and the step of sensitizing the porous semiconductor fine particles with a metal complex dye having a particular structure.

A preferred exemplary embodiment of the photoelectric conversion element produced by the method according to the present invention will be explained with reference to the drawing. As shown in FIG. 1, the photoelectric conversion element 10 is composed of an electrically conductive support 1; a photosensitive layer 2 provided on the electrically conductive support 1, the photosensitive layer having semiconductor fine particles to which a dye has been adsorbed; a charge transfer layer 3; and a counter electrode 4. The electrically conductive support 1 having a photosensitive layer 2 provided thereon functions as a working electrode in the photoelectric conversion element 10. This photoelectric conversion element 10 can be operated as a photoelectrochemical cell (not depicted) by making the element usable in a cell application where the cell is made to work with an external circuit 6.

A light-receiving electrode 5 is an electrode comprising an electrically conductive support 1; and a photosensitive layer (semiconductor film) 2 coated on the electrically conductive support, the layer containing semiconductor fine particles 22 to which a dye 21 has been adsorbed. A light incident to the photosensitive layer (semiconductor film) 2 excites the dye. The excited dye has electrons with high energy, and these electrons are transported from the dye 21 to the conduction band of the semiconductor fine particles 22 and further reach the electrically conductive support 1 by diffusion. At this time, the molecules of the dye 21 are in an oxide form; however, in a photoelectrochemical cell, the electrons on the electrode return to the oxide of the dye while working in the external circuit, while the light-receiving electrode 5 works as a negative electrode of this cell.

The photoelectric conversion element produced by the method of the present invention comprises a photosensitive layer that contains a porous semiconductor fine particle layer on which a dye described below has been adsorbed, provided on an electrically conductive support. The photosensitive layer is designed in accordance with the intended use, and may have a single layer structure or a multilayer structure. Although the dye in the photosensitive layer may be a single species or a mixture of various dyes, the dye described below is used as at least one kind of dye. The photosensitive layer in the photoelectric conversion element of the present invention comprises semiconductor fine particles on which the dye described below has been adsorbed whereby high sensitivity can be obtained and, when used for the photoelectrochemical cell, high conversion efficiency and durability can be obtained.

(A) Dye

Both the photoelectric conversion element and the photoelectrochemical cell of the present invention comprises a photosensitive layer that contains an electrically conductive support having thereon a semiconductor fine particle layer on which a dye having a structure represented by Formula (1) has been adsorbed.

$$M(LL^1)m_1(LL^2)m_2(X)m_3 \cdot CI \qquad \text{Formula (1)}$$

The dye having the structure represented by Formula (1) has a metal atom in the center and a ligand $LL^1$ and, in some cases, a ligand $LL^2$ and a particular functional group X coordinating to the metal atom, and, if necessary, electrical neutrality of the dye is kept with CI.

(A1) Metal Atom M

M represents a metal atom. M is preferably a metal that is capable of tetracoordination or hexacoordination; more preferably Ru, Fe, Os, Cu, W, Cr, Mo, Ni, Pd, Pt, Co, Ir, Rh, Re, Mn or Zn; particularly preferably Ru, Fe, Os or Cu; and most preferably Ru.

(A2) Ligand $LL^1$

The ligand $LL^1$ is a bidentate or terdentate ligand represented by Formula (2), and preferably a bidentate ligand. $m_1$ that represents the number of ligands represented by $LL^1$ is an integer of 1 to 3, preferably 1 or 2 and more preferably 1. When $m_1$ is an integer of 2 or more, $LL^1$'s may be the same or different from each other.

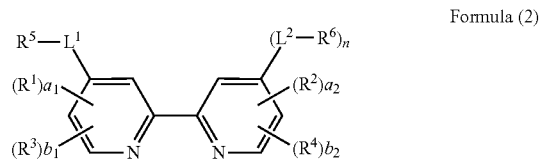

Formula (2)

In Formula (2), $R^1$ and $R^2$ each independently represent any one of a carboxyl group, a sulfonic acid group, a hydroxyl group, a hydroxamic group (preferably having 1 to 20 carbon atoms; for example, —CONHOH, —CONCH$_3$OH, and the like), a phosphoryl group (for example, —OP(O)(OH)$_2$, and the like) and a phosphonyl group (for example, —P(O)(OH)$_2$, and the like); preferably a carboxyl group, a phosphoryl group or a phosphonyl group; more preferably a carboxyl group or a phosphonyl group; and most preferably a carboxyl group. $R^1$ and $R^2$ may be substituted at any site of the pyridine-ring-forming carbon atoms.

In Formula (2), $R^3$ and $R^4$ each independently represent a substituent. Preferred examples thereof include an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an aryl group (preferably an aryl group having 6 to 26 carbon atoms, e.g. phenyl, 1-naphthyl, 4-methoxyphenyl, 2-chlorophenyl, or 3-methylphenyl), a heterocyclic group (preferably a heterocyclic group having 2 to 20 carbon atoms, e.g. 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxyphenoxy), an alkoxycarbonyl group (preferably an alkoxycarbonyl group having 2 to 20 carbon atoms, e.g. ethoxycarbonyl, or 2-ethylhexyloxycarbonyl), an amino group (preferably an amino group having 0 to 20 carbon atoms, e.g. amino, N,N-dimethylamino, N,N-diethylamino, N-ethylamino, or anilino), a sulfonamide group (preferably a sulfonamide group having 0 to 20 carbon atoms, e.g. N,N-dimethylsulfonamide, or N-phenylsulfonamide), an acyloxy group (preferably an acyloxy group having 1 to 20 carbon atoms, e.g. acetyloxy, or benzoyloxy), a carbamoyl group (preferably a carbamoyl group having 1 to 20 carbon atoms, e.g. N,N-dimethylcarbamoyl, or N-phenylcarbamoyl), an acylamino group (preferably an acylamino group having 1 to 20 carbon atoms, e.g. acetylamino, or benzoylamino), a cyano group, and a halogen atom (e.g. a fluorine atom, a chlorine atom, a bromine atom, or an iodine atom). Among these, an alkyl group, an alkenyl group, an aryl group, a heterocyclic group, an alkoxy group, an aryloxy group, an alkoxycarbonyl group, an amino group, an acylamino group, a cyano group and a halogen atom are more preferable; and an alkyl group, an alkenyl group, a heterocyclic group, an alkoxy group, an alkoxycarbonyl group, an amino group, an acylamino group and a cyano group are particularly preferable.

In the case where the ligand $LL^1$ contains an alkyl group, an alkenyl group or the like, these groups may be linear or branched, and may be substituted or unsubstituted. Likewise, in the case where the ligand $LL^1$ contains an aryl group, a heterocyclic group or the like, these groups may be a single ring or a condensed ring, and may be substituted or unsubstituted.

In Formula (2), $R^5$ and $R^6$ each independently represent an aryl group (preferably aryl groups having 6 to 30 carbon atoms, e.g. phenyl, a substituted phenyl, naphthyl, or a substituted naphthyl), or a heterocyclic group (preferably heterocyclic groups having 1 to 30 carbon atoms, e.g. 2-thienyl, 2-furyl, 2-pyrrolyl, 2-imidazolyl, 1-imidazolyl, 4-pyridyl, or 3-indolyl); preferably an aryl group or a heterocyclic group; and more preferably an aryl group having from 1 to 3 electron-donating groups or a heterocyclic group having a substituent.

Preferred examples of the electron-donating group on the aryl group include an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxphenoxy), an amino group (preferably an amino group having 0 to 20 carbon atoms, e.g. amino, N,N-dimethylamino, N,N-diethylamino, N-ethylamino, or anilino), an acylamino group (preferably an acylamino group having 1 to 20 carbon atoms, e.g. acetylamino, or benzoylamino), and a hydroxyl group. Among these, an alkyl group, an alkoxy group, an amino group and a hydroxyl group are more preferable; and an amino group is particularly preferable. The electron-donating group is preferably substituted at the 4-position with respect to $L^1$ or $L^2$.

$R^5$ and $R^6$ may be the same or different from each other. However, it is preferable that $R^5$ and $R^6$ are the same.

Preferred examples of the heterocyclic group represented by $R^5$ or $R^6$ include a 2-thienyl group, a 2-furyl group, a 2-pyrrolyl group, a 2-imidazolyl group, a 1-imidazolyl group, a 4-pyridyl group, and a 3-indolyl group. These heterocyclic groups may be substituted with a substituent(s). Preferred examples of the substituent on the hetero ring include an alkyl group, an alkenyl group, an alkynyl group, a cycloalkyl group, an alkoxy group, an aryloxy group, an aryl group, a heterocyclic group, an amino group and an acylamino group. Among these, an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an aryl group (preferably an aryl group having 6 to 26 carbon atoms, e.g. phenyl, 1-naphthyl, 4-methoxyphenyl, 2-chlorophenyl, or 3-methylphenyl), a heterocyclic group (preferably a heterocyclic group having 2 to 20 carbon atoms, e.g. 2-thienyl, 1-piperidyl, 4-morpholinyl, 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxyphenoxy), an alkoxycarbonyl group (preferably an alkoxycarbonyl group having 2 to 20 carbon atoms, e.g. ethoxycarbonyl, or 2-ethylhexyloxycarbonyl), an amino group (preferably an amino group having 0 to 20 carbon atoms, e.g. amino, N,N-dimethylamino, N,N-diethylamino, N-ethylamino, or anilino), a sulfonamide group (preferably a sulfonamide group having 0 to 20 carbon atoms, e.g. N,N-dimethylsulfonamide, or N-phenylsulfonamide), an acyloxy group (preferably an acyloxy group having 1 to 20 carbon atoms, e.g. acetyloxy, or benzoyloxy), a carbamoyl group (preferably a carbamoyl group having 1 to 20 carbon atoms, e.g. N,N-dimethylcarbamoyl, N-phenylcarbamoyl), an acylamino group (preferably an acylamino group having 1 to 20 carbon atoms, e.g. acetylamino, or benzoylamino), a cyano group, and a halogen atom (e.g. a fluorine atom, a chlorine atom, a bromine atom, or an iodine atom) are preferable; an alkyl group, an alkenyl group, an aryl group, a heterocyclic group, an alkoxy group, an aryloxy group, an alkoxycarbonyl group, an amino group, an acylamino group, a cyano group and a halogen atom are more preferable; and an alkyl group, an alkenyl group, a heterocyclic group, an alkoxy group, an alkoxycarbonyl group, an amino group, an acylamino group and a halogen atom are particularly preferable.

In Formula (2), $L^1$ and $L^2$ each independently represent a conjugated chain composed of a substituted or unsubstituted ethenylene group and/or ethynylene group. In the case where the ethenylene group has a substituent, the substituent is preferably an alkyl group, and more preferably a methyl group. Preferably $L^1$ and $L^2$ each independently stand for a conjugated chain having 2 to 6 carbon atoms, more preferably an ethenylene group, a butadienylene group, an ethynylene group, a butadiynylene group, a hexatriynylene group, a methylethenylene group, or a dimethylethenylene group; especially preferably an ethenylene group, or a butadienylene group; and most preferably an ethenylene group. $L^1$ and $L^2$ may be the same or different from each other. However, it is preferable that $L^1$ and $L^2$ are the same. In addition, when the conjugated chain contains a carbon-carbon double bond, each carbon-carbon double bond may be a trans form or a cis form, or a mixture thereof.

In Formula (2), n represents 0 or 1, and $a_1$ and $a_z$ each independently represent an integer of 0 to 3. When $a_1$ is an integer of 2 or more, $R^1$'s may be the same or different from each other. When $a_z$ is an integer of 2 or more, $R^2$'s may be the same or different from each other. $a_1$ is preferably 0 or 1, and $a_z$ is preferably an integer of 0 to 2. In particular, when n is 0, $a_z$ is preferably 1 or 2; and when n is 1, $a_z$ is preferably 0 or 1. The total of $a_1$ and $a_z$ is preferably an integer of 0 to 2.

In Formula (2), $b_1$ and $b_2$ each independently represent an integer of 0 to 3, preferably an integer of 0 to 2. When $b_1$ is an integer of 2 or more, $R^3$'s may be the same or different from each other, or $R^3$'s may be bonded with each other to form a ring. When $b_2$ is an integer of 2 or more, $R^4$'s may be the same or different from each other, or $R^4$'s may be bonded with each other to form a ring. When $b_1$ and $b_2$ each are 1, $R^3$ and $R^4$ may be bonded with each other to form a ring. Preferred examples of the formed ring include a benzene ring, a pyridine ring, a thiophene ring, a pyrrole ring, a cyclohexane ring, and a cyclopentane ring.

In Formula (2), when the total of $a_1$ and $a_2$ is 1 or more, that is to say, when the ligand $LL^1$ has at least any one of a carboxyl group, a sulfonic acid group, a hydroxyl group, a hydroxamic group, a phosphoryl group and a phosphonyl group, $m_1$ in the above-described Formula (1) is preferably 2 or 3, and more preferably 2.

The ligand $LL^1$ is preferably represented by Formula (4) or (5).

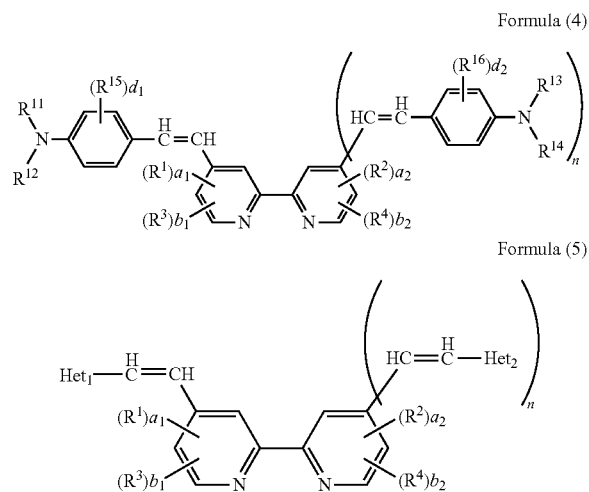

In Formulae (4) and (5), $R^1$ to $R^4$, $a_1$, $a_2$, $b_1$, $b_2$ and n have the same meaning as those in Formula (2), respectively.

In Formula (4), $R^{11}$ to $R^{14}$ each independently represent a hydrogen atom, an alkyl group, an alkenyl group, or an aryl group (preferable examples of the above groups are the same as $R^3$ and $R^4$); preferably an alkyl group or an aryl group; and more preferably an alkyl group. When $R^{11}$ to $R^{14}$ are an alkyl group, additionally the alkyl group may have a substituent. As for the substituent, an alkoxy group, a cyano group, an alkoxycarbonyl group, or a carbonamide group is preferable, and an alkoxy group is especially preferable. $R^{11}$ and $R^{12}$, and $R^{13}$ and $R^{14}$ are each bonded with each other to form a ring. Preferable examples of the ring to be formed include a pyrrolidine ring, a piperidine ring, a piperazine ring, and a morpholine ring.

In Formula (4), $R^{15}$ and $R^{16}$ each independently represents a substituent; preferably an alkyl group, an alkenyl group, an alkynyl group, a cycloalkyl group, an alkoxy group, an aryloxy group, an amino group, an acylamino group (preferable examples of each of the above-described groups are the same as $R^3$ and $R^4$) or a hydroxyl group; more preferably an alkyl group, an alkoxy group, an amino group or an acylamino group.

In Formula (4), $d_1$ and $d_2$ each independently represent an integer of 0 to 4. When $d_1$ is 1 or more, $R^{15}$ may be bonded with $R^{11}$ and/or $R^{12}$ to form a ring. The formed ring is preferably a piperidine ring or a pyrrolidine ring. When $d_1$ is 2 or more, $R^{15}$'s may be the same or different from each other, or may be bonded with each other to form a ring. When $d_2$ is 1 or more, $R^{16}$ may be bonded with $R^{13}$ and/or $R^{14}$ to form a ring. The formed ring is preferably a piperidine ring or a pyrrolidine ring. When $d_2$ is 2 or more, $R^{16}$'s may be the same or different from each other, or may be bonded with each other to form a ring.

In Formula (5), $Het_1$ and $Het_2$ each represent a heterocyclic group. Preferred examples of the heterocyclic group represented by $Het_1$ or $Het_2$ include a 2-thienyl group, a 2-furyl group, a 2-pyrrolyl group, a 2-imidazolyl group, a 1-imidazolyl group, a 4-pyridyl group, and a 3-indolyl group. These heterocyclic groups may be substituted with a substituent(s). Preferred examples of the substituent on the hetero ring include an alkyl group, an alkenyl group, an alkynyl group, a cycloalkyl group, an alkoxy group, an aryloxy group, an aryl group, a heterocyclic group, an amino group and an acylamino group. Among these, an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an aryl group (preferably an aryl group having 6 to 26 carbon atoms, e.g. phenyl, 1-naphthyl, 4-methoxyphenyl, 2-chlorophenyl, or 3-methylphenyl), a heterocyclic group (preferably a heterocyclic group having 2 to 20 carbon atoms, e.g. 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxphenoxy), an alkoxycarbonyl group (preferably an alkoxycarbonyl group having 2 to 20 carbon atoms, e.g. ethoxycarbonyl, or 2-ethylhexyloxycarbonyl), an amino group (preferably an amino group having 0 to 20 carbon atoms, e.g. amino, N,N-dimethylamino, N,N-diethylamino, N-ethylamino, or anilino), a sulfonamide group (preferably a sulfonamide group having 0 to 20 carbon atoms, e.g. N,N-dimethylsulfonamide, or N-phenylsulfonamide), an acyloxy group (preferably an acyloxy group having 1 to 20 carbon atoms, e.g. acetyloxy, or benzoyloxy), a carbamoyl group (preferably a carbamoyl group having 1 to 20 carbon atoms, e.g. N,N-dimethylcarbamoyl, or N-phenylcarbamoyl), an acylamino group (preferably an acylamino group having 1 to 20 carbon atoms, e.g. acetylamino, or benzoylamino), a cyano group, and a halogen atom (e.g. a fluorine atom, a chlorine atom, a bromine atom, or an iodine atom) are preferable; an alkyl group, an alkenyl group, an aryl group, a heterocyclic group, an alkoxy group, an aryloxy group, an alkoxycarbonyl group, an amino group, an acylamino group, a cyano group and a halogen atom are more preferable; and an alkyl group, an alkenyl group, a heterocyclic group, an alkoxy group, an alkoxycarbonyl group, an amino group, an acylamino group and a halogen atom are particularly preferable.

Specific examples of the ligand $LL^1$ are shown in the followings, but the present invention is not limited thereto.

Herein, "Et" represents an ethyl group, "Pr(n)" represents a n-propyl group, "Bu(n)" represents a n-butyl group, "Hex (n)" represents a n-hexyl group, and "Oct(n)" represents an n-octyl group.

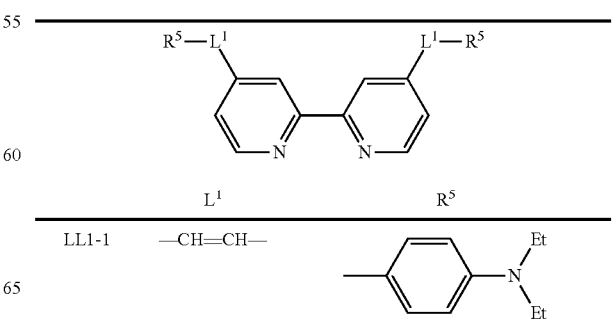

| | $L^1$ | $R^5$ |
|---|---|---|
| LL1-1 | —CH=CH— | |

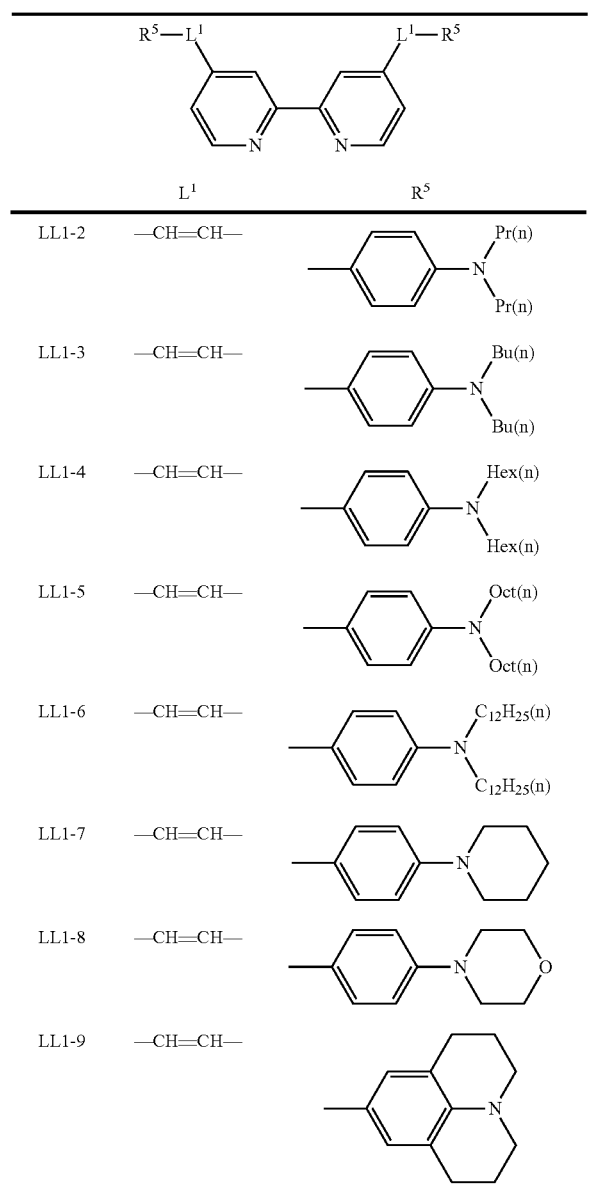
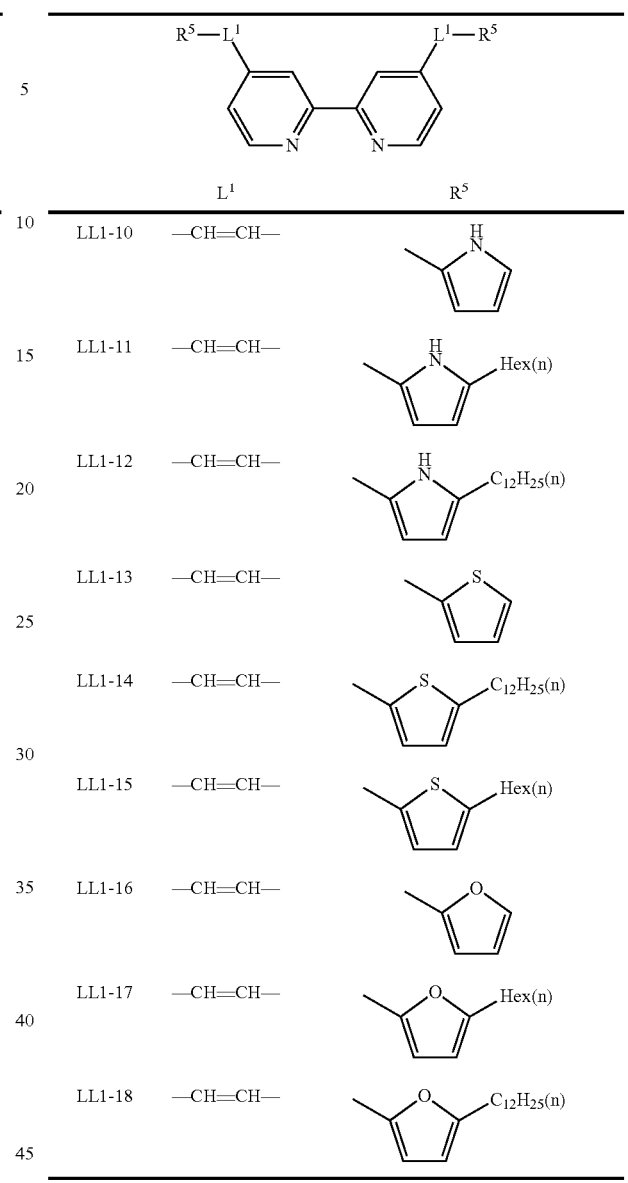
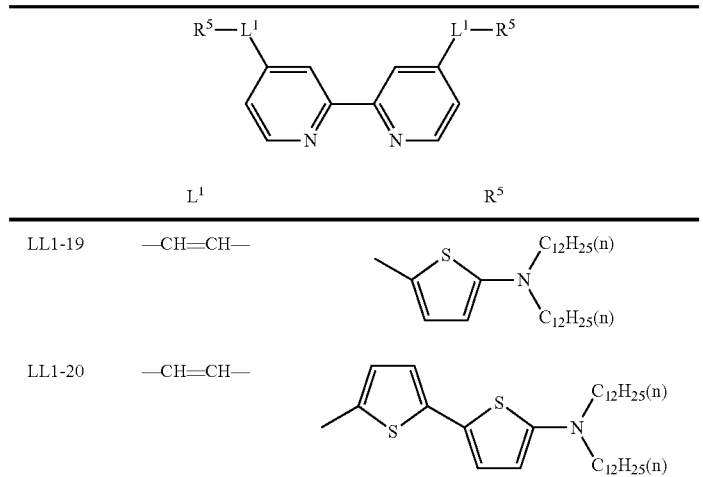

-continued
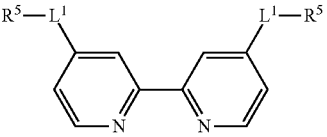
| | L¹ | R⁵ |
|---|---|---|
| LL1-21 | —CH=CH— | 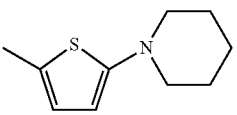 |
| LL1-22 | —CH=CH— | 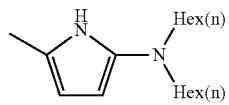 |
| LL1-23 | —CH=CH— | 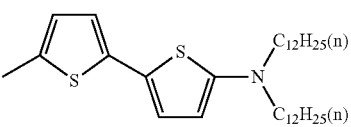 |
| LL1-24 | —CH=CH— | 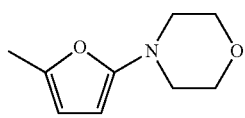 |
| LL1-25 | —C≡C— | 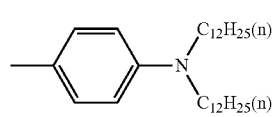 |
| LL1-26 | —C≡C— | 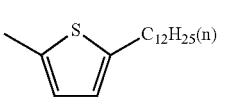 |
| LL1-27 | —C≡C— | 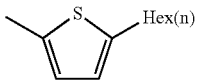 |
| LL1-28 | —C≡C— | 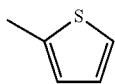 |
| LL1-29 | —(CH=CH)₂— | 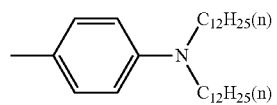 |
| LL1-30 | —(CH=CH)₂— | 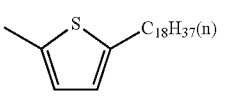 |
| LL1-31 | —(CH=CH)₂— | 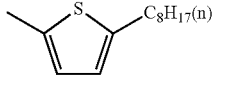 |
| LL1-32 | —(CH=CH)₃— | 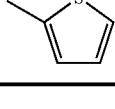 |

(A3) Ligand $LL^2$

In Formula (1), $LL^2$ represents a bidentate or terdentate ligand. $m_2$ that represents the number of ligands represented by $LL^2$ is an integer of 0 to 2, preferably 0 or 1. $m_2$ is an integer of 2, $LL^2$'s may be the same or different from each other.

The ligand $LL^2$ is preferably a bidentate or tridentate ligand, which is represented by Formula (3).

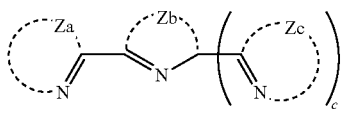

Formula (3)

In Formula (3), Za, Zb and Zc each independently represent a group of non-metallic atoms for forming a 5- or 6-membered ring. The formed 5- or 6-membered ring may be substituted or unsubstituted, and may be a single ring or a condensed ring. Each of Za, Zb and Zc is preferably composed of a carbon atom, a hydrogen atom, a nitrogen atom, an oxygen atom, a sulfur atom, a phosphor atom and/or a halogen atom, and preferably forms an aromatic ring. In the case of the 5-membered ring, an imidazole ring, an oxazole ring, a thiazole ring, or a triazole ring is preferably formed. In the case of the 6-membered ring, a pyridine ring, a pyrimidine ring, a pyridazine ring, or a pyrazine ring is preferably formed. Among these rings, an imidazole ring and a pyridine ring are more preferable. Thus-formed rings may be condensed with a benzene ring. Examples thereof include a quinoline ring and a benzimidazole ring. Further, respective substituent that is substituted on the ring formed by each of Za, Zb and Zc may be bonded with each other to form a ring. For example, respective ring that is formed by each of Za and Zb may be condensed to form a 1,10-phenanthroline ring compound.

In Formula (3), c represents 0 or 1. c is preferably 0. That is, $LL^2$ is preferably a bidentate ligand.

Ligand $LL^2$ is preferably represented by any one of Formula (6-1) to Formula (6-8), and more preferably represented by Formula (6-1), Formula (6-2), Formula (6-4) or Formula (6-6). Ligand $LL^2$ is especially preferably represented by Formula (6-1) or Formula (6-2), and most preferably represented by Formula (6-1). Note that the substituent substituted on the nitrogen-containing heterocyclic ring also includes substituents such that if Formula (6-1) is taken as an example, $R^{21}$ and $R^{29}$ are substituted so that $R^{21}$ and $R^{29}$ are distributed all over two pyridine rings.

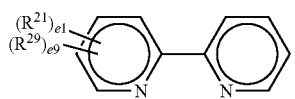

Formula (6-1)

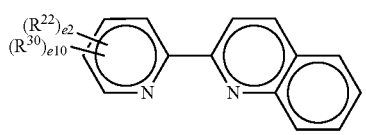

Formula (6-2)

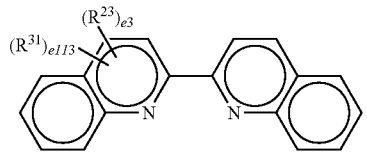

Formula (6-3)

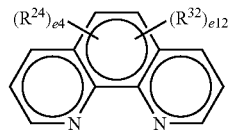

Formula (6-4)

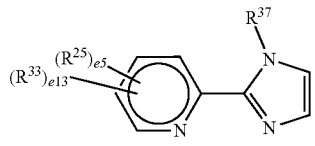

Formula (6-5)

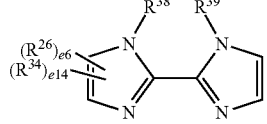

Formula (6-6)

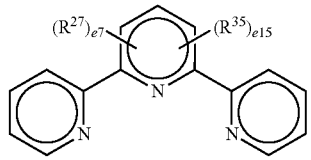

Formula (6-7)

Formula (6-8)

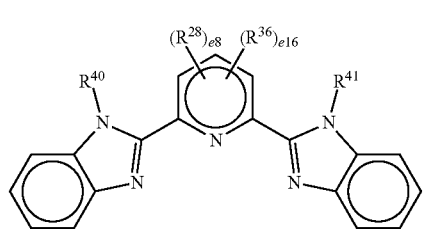

In Formulas (6-1) to (6-8), $R^{21}$ to $R^{28}$ each independently represent any one of a carboxyl group, a sulfonic acid group, a hydroxyl group, a hydroxamic group (preferably having 1 to 20 carbon atoms; for example, —CONHOH, —CONCH$_3$OH, and the like), a phosphoryl group (for example, —OP(O)(OH)$_2$, and the like) and a phosphonyl group (for example, —P(O)(OH)$_2$, and the like); preferably a carboxyl group, a phosphoryl group or a phosphonyl group; more preferably a carboxyl group or a phosphonyl group; and most preferably a carboxyl group.

In Formulae (6-1) to (6-8), $R^{29}$ to $R^{36}$ each independently represent a substituent. $R^{29}$ to $R^{36}$ each are preferably an alkyl group, an alkenyl group, a cycloalkyl group, an aryl group, a heterocyclic group, an alkoxy group, an aryloxy group, an alkoxycarbonyl group, an amino group, an acyl group, a sulfonamide group, an acyloxy group, a carbamoyl group, an acylamino group, a cyano group, or a halogen atom (preferable examples of each of the above-described groups are the same as $R^3$ and $R^4$); more preferably an alkyl group, an alkenyl group, aryl group, a heterocyclic group, an alkoxy group, an alkoxycarbonyl group, an amino group, an acylamino group, or a halogen atom; and especially preferably an alkyl group, an alkenyl group, an alkoxy group, an alkoxycarbonyl group, an amino group, or an acylamino group.

In Formulae (6-1) to (6-8), $R^{37}$ to $R^{41}$ each independently represent a hydrogen atom, an alkyl group, an alkenyl group or an aryl group (preferable examples of the above-described groups are the same as $R^3$ and $R^4$). Further, when the ligand $LL^2$ contains an alkyl group, an alkenyl group or the like, these groups may be linear or branched, and may be substituted or unsubstituted. Meanwhile, when the ligand $LL^2$ includes an aryl group, a heterocyclic group or the like, these groups may be a single ring or a condensed ring, and may be substituted or unsubstituted. It is preferable that each of $R^{37}$ to $R^{41}$ each independently represents an alkyl group, and more preferably an alkyl group having a carboxyl group.

In Formulae (6-1) to (6-8), each of $R^{21}$ to $R^{36}$ may bind to any site of two or more rings as described above. e1 to e6 each independently represent an integer of 0 to 4, preferably an integer of 0 to 2. e7 and e8 each independently represent an integer of 0 to 4, preferably an integer of 0 to 3. e9 to e12 and e15 each independently represent an integer of 0 to 6. e13, e14 and e16 each independently represent an integer of 0 to 4. e9 to e16 each are preferably an integer of 0 to 3.

When each of e1 to e8 is 2 or more, each of $R^{21}$'s to $R^{28}$'s is the same or different from each other. When each of e9 to e16 is 2 or more, each of $R^{29}$'s to $R^{36}$'s is the same or different from each other, or may be bonded with each other to form a ring.

Specific examples of the ligand $LL^2$ are shown in the followings, but the present invention is not limited thereto.

| | $R^{71}$ |
|---|---|
| L-1 | H |
| L-2 | —$CH_3$ |
| L-3 | —$OC_2H_5$ |
| L-4 | —$N(C_4H_9)_2$ |
| L-5 | —COOH |
| L-6 | —$PO_3H_2$ |
| L-7 | —CONHOH |
| L-8 | —$COOC_2H_5$ |
| L-9 | Br |
| L-10 | —OH |
| L-11 | —$OPO_3H_2$ |
| L-12 | —C$_6$H$_5$ (phenyl) |
| L-13 | —$OCOCH_3$ |
| L-14 | —$SO_3H$ |

(A4) Ligand X

In Formula (1), X represents a monodentate or bidentate ligand. $m_3$ that represents the number of ligands represented by X represents an integer of 0 to 2. $m_3$ is preferably 1 or 2. When X is a monodentate ligand, $m_3$ is preferably 2. When X is a bidentate ligand, $m_3$ is preferably 1. When $m_3$ is an integer of 2, X's may be the same or different from each other, or X's may be bonded to each other.

The ligand X represents a monodentate or bidentate ligand which coordinates through a coordinating group selected from the group consisting of an acyloxy group (preferably an acyloxy group having 1 to 20 carbon atoms, for example, acetyloxy, benzoyloxy, salicylic acid, glycyloxy, N,N-dimethylglycyloxy, oxalylene group (—OC(O)C(O)O—), and the like), an acylthio group (preferably an acylthio group having 1 to 20 carbon atoms, for example, acetylthio, benzoylthio, and the like), a thioacyloxy group (preferably a thioacyloxy group having 1 to 20 carbon atoms, for example, thioacetyloxy ($CH_3C(S)O$—) and the like), a thioacylthio group (preferably a thioacylthio group having 1 to 20 carbon atoms, for example, thioacetylthio ($CH_3C(S)S$—), thiobenzoylthio (PhC(S)S—) and the like), an acylaminooxy group (preferably an acylaminooxy group having 1 to 20 carbon atoms, for example, N-methylbenzoyl aminooxy (PhC(O)N($CH_3$)O—), acetylaminooxy ($CH_3C(O)NHO$—) and the like), a thiocarbamate group (preferably a thiocarbamate group having 1 to 20 carbon atoms, for example, N,N-diethylthiocarbamate and the like), a dithiocarbamate group (preferably a dithiocarbamate group having 1 to 20 carbon atoms, for example, N-phenydithio carbamate, N,N-dimethyldithiocarbamate, N,N-diethyldithiocarbamate, N,N-dibenzyldithiocarbamate and the like), a thiocarbonate group (preferably a thiocarbonate group having 1 to 20 carbon atoms, for example, ethylthiocarbonate and the like), a dithiocarbonate group (preferably a dithiocarbonate group having 1 to 20 carbon atoms, for example, ethyldithiocarbonate ($C_2H_5OC(S)S$—) and the like), a trithiocarbonate group (preferably a trithiocarbonate group having 1 to 20 carbon atoms, for example, ethyltrithiocarbonate ($C_2H_5SC(S)S$—) and the like), an acyl group (preferably an acyl group having 1 to 20 carbon atoms, for example, acetyl, benzoyl and the like), a thiocyanate group, an isothiocyanate group, a cyanate group, an isocyanate group, a cyano group, an alkylthio group (preferably an alkylthio group having 1 to 20 carbon atoms, for example, methanethio, ethylenedithio, and the like), an arylthio group (preferably an arylthio group having 6 to 20 carbon atoms, for example, benzenethio, 1,2-phenylenedithio and the like), an alkoxy group (preferably an alkoxy group having 1 to 20 carbon atoms, for example, methoxy and the like) and an aryloxy group (preferably an aryloxy group having 6 to 20 carbon atoms, for example, phenoxy, quinoline-8-hydroxyl group and the like), or a ligand composed of a halogen atom (preferably a chlorine atom, a bromine atom, an iodine atom and the like), a carbonyl (. . . CO); a dialkylketone (preferably a dialkylketone having 3 to 20 carbon atoms, for example, acetone (($CH_3$)$_2$CO. . .) and the like), a 1,3-diketone (preferably a 1,3-diketone having 3 to 20 carbon atoms, for example, acetylacetone ($CH_3C(O. . .)CH=C(O$—$)CH_3$), a trifluoro acetylacetone ($CF_3C(O. . .)CH=C(O$—$)CH_3$), dipivaloylmethane O—$C_4H_9C(O. . .)CH=C(O$—) t-$C_4H_9$), dibenzoylmethane (PhC(O. . .)CH=C(O—)Ph), 3-chloroacetylacetone ($CH_3C(O. . .)CCl=C(O$—$)CH_3$) and the like), a carbonamide group (preferably a carbonamide group having 1 to 20 carbon atoms, for example, $CH_3N=C(CH_3)O$—, —OC(=NH)—C(=NH)O— and the like), a thiocarbonamide group (preferably a thiocarbonamide group having 1 to 20 carbon atoms, for example, $CH_3N=C(CH_3)S$— and the like), or a thiourea (preferably a thiourea having 1 to 20 carbon atoms, for example, (NH(. . .)=C(S—)NH$_2$, $CH_3NH$(. . .)=C(S—)NH $CH_3$, ($CH_3$)$_2$N—C(S. . .)N($CH_3$)$_2$ and the like). Note that ". . ." indicates a coordinate bond with M that is a metal atom.

The ligand X is preferably a ligand which coordinates through a coordinating group selected from the group consisting of an acyloxy group, a thioacylthio group, an acylaminooxy group, a dithiocarbamate group, a dithiocarbonate group, a trithiocarbonate group, a thiocyanate group, an isothiocyanate group, a cyanate group, an isocyanate group, a cyano group, an alkylthio group, an arylthio group, an alkoxy group and an aryloxy group, or a ligand composed of a halogen atom, a carbonyl, a 1,3-diketone or a thiourea; more preferably a ligand which coordinates through a coordinating group selected from the group consisting of an acyloxy group, an acylaminooxy group, a dithiocarbamate group, a thiocyanate group, an isothiocyanate group, a cyanate group, an isocyanate group, a cyano group and an arylthio group, or a ligand composed of a halogen atom, a 1,3-diketone or a thiourea; especially preferably a ligand which coordinates through a coordinating group selected from the group consisting of a dithiocarbamate group, a thiocyanate group, an isothiocyanate group, a cyanate group and an isocyanate group, or a ligand composed of a halogen atom or a 1,3-diketone; and most preferably a ligand which coordinates through a coordinating group selected from the group consisting of a dithiocarbamate group, a thiocyanate group and an isothiocyanate group, or a ligand composed of a 1,3-diketone. Note that in the case where the ligand X includes an alkyl group, an alkenyl group, an alkynyl group, an alkylene group, or the like, these groups may be linear or branched, and may be substituted or unsubstituted. In the case where the ligand X includes an aryl group, a heterocyclic group, a cycloalkyl group, or the like, these groups may be substituted or unsubstituted, and may be a single ring or a condensed ring.

In the case where X is a bidentate ligand, X is preferably a ligand which coordinates through a coordinating group selected from the group consisting of an acyloxy group, an acylthio group, a thioacyloxy group, a thioacylthio group, an acylaminooxy group, a thiocarbamate group, a dithiocarbamate group, a thiocarbonate group, a dithiocarbonate group, a trithiocarbonate group, an acyl group, an alkylthio group, an arylthio group, an alkoxy group and an aryloxy group, or a ligand composed of a 1,3-diketone, a carbonamide group, a thiocarbonamide group or a thiourea.

In the case where X is a monodentate ligand, X is preferably a ligand which coordinates through a coordinating group selected from the group consisting of a thiocyanate group, an isothiocyanate group, a cyanate group, an isocyanate group, a cyano group, an alkylthio group and an arylthio group, or a ligand composed of a halogen atom, a carbonyl, a dialkylketone or a thiourea.

In the case where M in Formula (1) is a metal that is likely to form quadridentate coordination, such as Cu, Pd or Pt, it is preferable that $m_2$ is 0 and $m_1$ is 1 or 2. When $m_1$ is 1, $m_3$ is preferably 1 or 2. When $m_1$ is 2, $m_3$ is preferably 0. In the case of a metal that is likely to form hexadentate coordination, $m_1$ is preferably 1 or 2. When $m_1$ is 1, $m_2$ is preferably 1 or 2, more preferably 1. When $m_2$ is 1, $m_3$ is preferably 1 or 2. When $m_2$ is 2, $m_3$ is preferably 0. When $m_1$ is 2, $m_2$ is preferably 0 or 1, and more preferably 0. When $m_2$ is 0, $m_3$ is preferably an integer of 0 to 2. When $m_2$ is 1, $m_3$ is preferably 0. When $m_1$ is 3, both $m_2$ and $m_3$ are preferably 0. Of these the embodiment in which $m_1$ is 1, $m_2$ is 1, $m_3$ is 1 or 2, and $LL^2$ is a bidentate or tridentate ligand represented by the above-described Formula (6-1) is especially preferable.

(A5) Counter Ion CI

CI in Formula (1) represents a counter ion in the case where the counter ion is necessary to neutralize a charge. Whether the dye is cationic or anionic, or has a net ionic charge depends on the metal, the ligand and the substituent in the dye. In the case where the substituent has a dissociative group, the dye may have a negative charge with the dissociation. In this case, an electric charge of the molecule as a whole is neutralized with the CI.

Typical examples of the positive counter ion include an inorganic or organic ammonium ion (for example, tetraalkyl ammonium ion, pyridinium ion and the like), an alkali metal ion and a proton. Meanwhile, the negative counter ion may be an inorganic negative ion or an organic negative ion. Examples thereof include a halogen negative ion (for example, fluoride ion, chloride ion, bromide ion, iodide ion and the like), a substituted arylsulfonate ion (for example, p-toluene sulfonate ion, p-chlorobenzene sulfonate ion and the like), an aryldisulfonate ion (for example, 1,3-benzene disulfonate ion, 1,5-naphthalene disulfonate ion, 2,6-naphthalene disulfonate ion and the like), an alkylsulfate ion (for example, methylsulfate ion and the like), a sulfate ion, a thiocyanate ion, a perchlorate ion, a tetrafluoroborate ion, a hexafluorophosphae ion, a picrate ion, an acetate ion and a trifluoromethane sulfonate ion. Alternatively, as a charge balance counter ion, an ionic polymer or another dye with the opposite charge from the primary dye may be used. Alternatively, a metal complex ion (for example, bisbenzene-1,2-dithiolatonickel (III) and the like) may be used.

(A6) Interlocking Group

The metal complex dye represented by Formula (1) preferably has at least one interlocking group that is suitable to the surface of semiconductor fine particles, more preferably from 1 to 6 interlocking groups, and especially preferably from 1 to 4 interlocking groups. Preferred examples of the interlocking group include an acidic group (a substituent having a dissociable proton) such as a carboxyl group, a sulfonate group, a hydroxyl group, a hydroxamic group (for example, —CONHOH and the like), a phosphoryl group (for example, —OP(O)(OH)$_2$ and the like) and a phosphonyl group (for example, —P(O)(OH)$_2$ and the like).

(A7) Specific Examples of the Metal Complex Dye

The above-described metal complex dye preferably has at least any one of a carboxyl group, a sulfonic acid group, a hydroxyl group, a hydroxamic group, a phosphoryl group and a phosphonyl group. Among the metal complex dyes represented by Formula (1) that are used in the present invention, an especially preferable dye is a ruthenium complex dye represented by Formula (10).

$$\text{Ru}(LL^1)m_1(LL^2)m_2(X)m_3 \cdot \text{CI} \qquad \text{(Formula 7)}$$

[Herein, $LL^1$ is a bidentate or terdentate ligand represented by Formula (2). $LL^1$ is preferably a ligand represented by Formula (4) or (5). $LL^2$ is a bidentate or terdentate ligand represented by any one of Formula (6-1) to Formula (6-8) described above.

X represents a monodentate or bidentate ligand which coordinates through a group selected from the group consisting of an acyloxy group, an acylthio group, a thioacyloxy group, a thioacylthio group, an acylaminooxy group, a thiocarbamate group, a dithiocarbamate group, a thiocarbonate group, a dithiocarbonate group, a trithiocarbonate group, an acyl group, a thiocyanate group, an isothiocyanate group, a cyanate group, an isocyanate group, a cyano group, an alkylthio group, an arylthio group, an alkoxy group and an aryloxy group, or a monodentate or bidentate ligand composed of a halogen atom, a carbonyl, a dialkylketone, a 1,3-diketone, a carbonamide, a thiocarbonamide or a thiourea.

$m_1$ is 1 or 2, and when $m_1$ is an integer of 2, $LL^1$'s may be the same or different from each other. $m_2$ is 0 or 1. $m_3$ is an integer of 0 to 2, and when $m_3$ is an integer of 2, X's may be the same or different from each other, or X's may be bonded to each other. Both $m_2$ and $m_3$ are not 0 at the same time. CI represents a counter ion in the case where the counter ion is necessary to neutralize a charge.]

Further, $R^{11}$ and/or $R^{12}$ in the above-described Formulae (4) and (5) are preferably an alkyl group substituted with an alkoxy group. It is preferable that $m_1$ is 1, $m_2$ is 1 and $m_3$ is 1 or 2.

Specific examples of the metal complex dye used in the present invention are shown below. However, the present invention is not limited thereto. In the case where the metal complex dye in the following specific examples thereof contains a ligand having a proton-dissociable group, the ligand may release a proton with dissociation as needed.
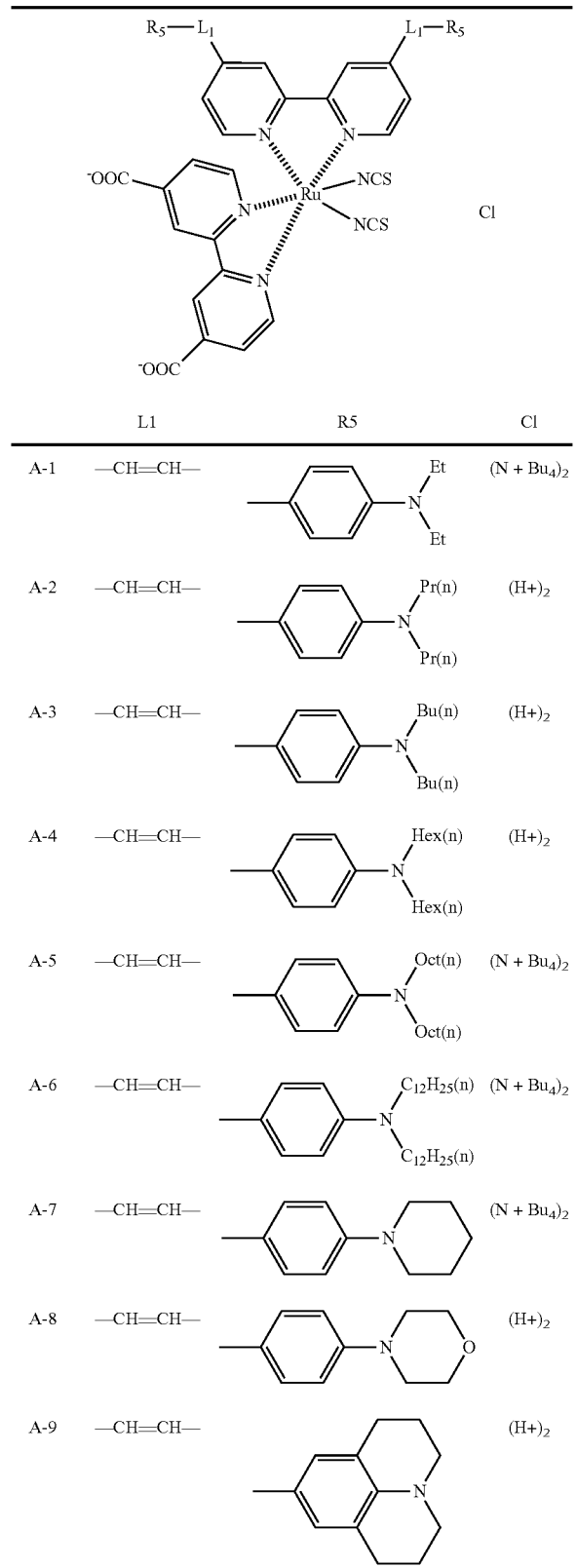
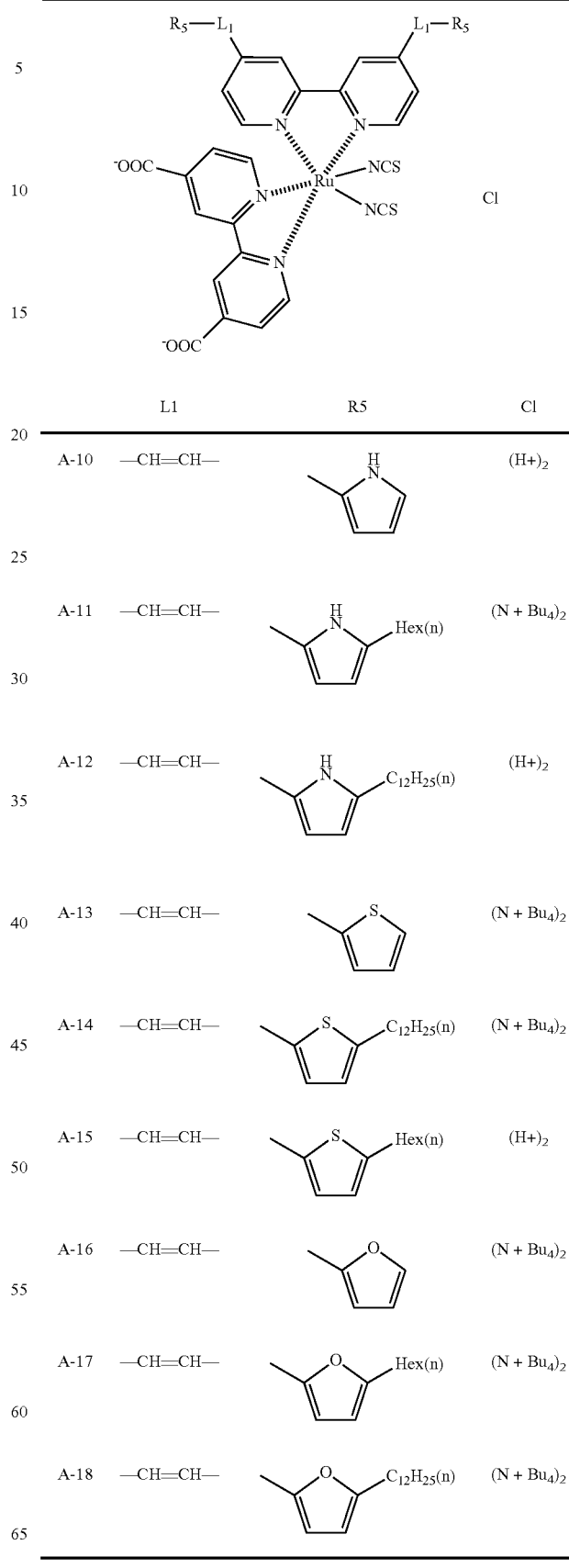

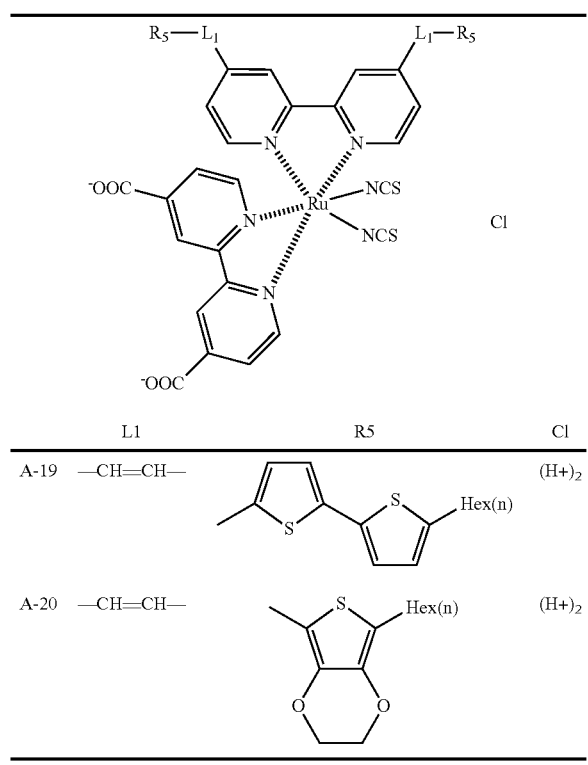

The metal complex dye represented by Formula (1) according to the present invention can be synthesized with reference to JP-A-2001-291534 and a method that is cited in the above Japanese patent publication.

The dye of the present invention has a maximum absorption wavelength in a solution in a range of preferably from 400 nm to 1,000 nm, more preferably from 410 nm to 900 nm, and especially still more preferably from 420 nm to 800 nm (B) Electrically Conductive Support In the photoelectric conversion element of the present invention as shown in FIG. 1, a photosensitive layer 2 in which a dye 21 has been adsorbed on porous semiconductor fine particles 22 is formed on an electrically conductive support 1. As described below, a photosensitive layer can be produced by, for example, a method in which a dispersion liquid of semiconductor fine particles is coated and dried on the electrically conductive support, and then the resultant support is immersed in a dye solution according to the present invention.

As the electrically conductive support, a support having electroconductivity per se, such as a metal, or a glass or polymeric material having an electrically conductive layer on the surface can be used. It is preferable that the electrically conductive support is substantially transparent. The terms "substantially transparent" means that the transmittance of light is 10% or more, preferably 50% or more, particularly preferably 80% or more. As the electrically conductive support, a support formed from glass or a polymeric material and coated with an electrically conductive metal oxide can be used. In this case, the amount of coating of the conductive metal oxide is preferably 0.1 to 100 g per square meter of the support made of glass or a polymeric material. In the case of using a transparent conductive support, it is preferable that light is incident from the support side. Examples of the polymeric material that may be preferably used include tetraacetylcellulose (TAC), polyethylene terephthalate (PET), polyethylene naphthalate (PEN), syndiotactic polystyrene (SPS), polyphenylene sulfide (PPS), polycarbonate (PC), polyarylate (PAR), polysulfone (PSF), polyester sulfone (PES), polyether imide (PEI), cyclic polyolefin, and phenoxy bromide.

In the present invention, the thickness of the electrically conductive support is preferably 10 μm or more and 2,000 μm or less, further preferably 10 μm or more and 1,000 μm or less, and particularly preferably 50 μm or more and 500 μm or less. If the support becomes too thick, it may pose a problem for use of the photoelectric conversion element due to the lack of flexibility thereof. Meanwhile, if the support is too thin, there is a possibility of breakage during the use of the photoelectric conversion element, which is not preferable.

In the present invention, an electrically conductive support having lower surface resistance is preferred. The surface resistance is preferably in the range of 10 $\Omega/m^2$ or less, further preferably 1 $\Omega/m^2$ or less, and particularly preferably 0.1 $\Omega/m^2$ or less. If the value of surface resistance is too high, the support becomes so difficult to conduct electricity that the photoelectric conversion element cannot exhibit its function.

As the electrically conductive support used in the present invention, an element in which an electrically conductive layer is provided on a polymeric material layer can be preferably used. The polymeric material layer is not particularly limited, but the plumeric material is selected from those that do not maintain its shape by melting in the case where a dispersion liquid of semiconductor fine particles is coated on the electrically conductive layer, and then heated. The electrically conductive layer can be produced on the polymeric material layer by a conventional method, for example, by a laminating process using extrusion coating, or the like.

Examples of the polymeric material that may be preferably used include tetraacetylcellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyester sulfone (PES), polyether imide (PEI), cyclic polyolefin, and phenoxy bromide.

By using a layered product, in which the electrically conductive layer is provided on a polymeric material layer, as an electrically conductive support used in the present invention, the polymeric material layer enables to function as a protective layer for a photoelectric conversion element and a photoelectrochemical cell. When a material that provides an electrical insulation is used as the polymeric material, the polymeric material layer functions not only as a protective layer but also as an insulating layer. By this, the photoelectric conversion element itself enables to get insulation properties. In the case where the polymeric material layer is used as an insulating layer, it is preferable to use a material having the specific volume resistance of $10^{10}$ to $10^{20} \cdot \Omega \cdot cm$, more preferably $10^{11}$ to $10^{19} \cdot \Omega \cdot cm$. When the above-described material is used but none of conductive material is blended therewith in particular, an insulating layer having the specific volume resistance of the above-described range can be obtained.

It is preferable that the electrically conductive support is substantially transparent. The terms "substantially transparent" means that the transmittance of light is 10% or more, preferably 50% or more, particularly preferably 80% or more.

The electrically conductive support may be provided with a light management function at the surface, and for example, the anti-reflective film having a high refractive index film and a low refractive index oxide film alternately laminated, and the light guide function.

It is preferable to provide the electrically conductive support with a function of blocking ultraviolet light. For instance, there may be mentioned a method of adopting a fluorescent material that is capable of changing ultraviolet light to visible light, within the polymeric material layer or on the surface of the polymeric material layer. As another preferred method, a method of using an ultraviolet absorbent may also be used. The conductive support may also be imparted with the functions described in JP-A-11-250944.

Since the resistance value of the electrically conductive film is increased as the cell area increases, a collecting electrode may be disposed. Preferred examples of the shape and material of the collecting electrode include those described in, for example, JP-A-11-266028. A gas barrier film and/or an ion diffusion preventing film may be disposed between the polymeric material layer and the electrically conductive layer. The gas barrier layer may be any of a resin film or an inorganic film.

(C) Semiconductor Fine Particles

As shown in FIG. 1, in the photoelectric conversion element of the present invention, the photosensitive layer 2 in which the dye 21 has been adsorbed on the porous semiconductor fine particles 22 is formed on the electrically conductive support 1. As described below, for example, a dispersion liquid of semiconductor fine particles is coated on the above-described electrically conductive support and dried, and then the resultant support is soaked in a solution of the dye of the present invention, thereby making it possible to produce a photosensitive layer.

Regarding the semiconductor fine particles, fine particles of chalcogenides of metals (for example, oxides, sulfides and selenides), or fine particles of perovskites may be used with preference. Preferred examples of the chalcogenides of metals include oxides of titanium, tin, zinc, tungsten, zirconium, hafnium, strontium, indium, cerium, yttrium, lanthanum, vanadium, niobium or tantalum, cadmium sulfide, and cadmium selenide. Preferred examples of the perovskites include strontium titanate, and calcium titanate. Among these, titanium oxide, zinc oxide, tin oxide, and tungsten oxide are particularly preferred.

Semiconductors are classified into n-type semiconductors in which the carrier associated with conduction is electron, or p-type semiconductors in which the carrier is a hole. It is preferable to use an n-type semiconductor in the present invention, in view of the conversion efficiency. The n-type semiconductors include an intrinsic semiconductor (or true semiconductor) which does not have an impurity level, and has equal concentrations of the carriers consisting of the conduction band electrons and the valence band holes, as well as an n-type semiconductor having a higher concentration of the electron carrier due to the structural defect originating from impurities. Examples of the n-type inorganic semiconductors that may be preferably used in the present invention include $TiO_2$, $TiSrO_3$, $ZnO$, $Nb_2O_3$, $SnO_2$, $WO_3$, Si, CdS, CdSe, $V_2O_5$, ZnS, ZnSe, SnSe, $KTaO_3$, $FeS_2$, PbS, InP, GaAs, $CuInS_2$, and $CuInSe_2$. Among these, most preferred examples of the n-type semiconductors include $TiO_2$, ZnO, $SnO_2$, $WO_3$ and $Nb_2O_3$. A composite semiconductor material composed of plural kinds of these semiconductors is also used with preference.

The particle size of the semiconductor fine particles is such that, for the purpose of maintaining the viscosity of the semiconductor fine particle dispersion liquid high, the average particle size of the primary particles is preferably 2 nm or more and 50 nm or less, and it is more preferable that the semiconductor fine particles are ultrafine particles having an average particle size of the primary particles of 2 nm or more and 30 nm or less. Two or more kinds of fine particles having different particle size distributions may be used in mixture, and in this case, it is preferable that the average size of the smaller particles is 5 nm or less. Also, for the purpose of enhancing the light-capturing rate by scattering the incident light, large particles having an average particle size of more than 50 nm can be added at a low proportion based on the ultrafine particles described above. In this case, the content of the large particles is preferably 50% or less, and more preferably 20% or less, by mass of the content of the particles having an average particle size of 50 nm or less. The average particle size of the large particles that are added and mixed for the purpose described above is preferably 100 nm or more, and more preferably 250 nm or more.

In regard to the method for producing semiconductor fine particles, gel-sol methods described in, for example, Sakka, Sumio, "Science of Sol-Gel Processes", Agne Shofu Publishing, Inc. (1998) and the like, are preferred. It is also preferable to use a method developed by Degussa GmbH, in which a chloride is hydrolyzed at high temperature in an acid hydride salt to produce an oxide. When the semiconductor fine particles are titanium oxide, the sol-gel method, the gel-sol method, and the method of hydrolyzing a chloride in an acid hydride salt at high temperature, are all preferred, and the sulfuric acid method and chlorine method described in Seino, Manabu, "Titanium Oxide: Material Properties and Application Technologies", Gihodo Shuppan Co., Ltd. (1997) may also be used. Other preferred examples of the sol-gel method include the method described in Barbe et al., Journal of American Ceramic Society, Vol. 80, No. 12, pp. 3157-3171 (1997), and the method described in Burnside et al., Chemistry of Materials, Vol. 10, No. 9, pp. 2419-2425.

In addition to these, examples of the method of producing the semiconductor fine particles include, as preferred methods for producing titania nanoparticles, a method based on flame hydrolysis of titanium tetrachloride, a method of combusting titanium tetrachloride, a method of hydrolyzing a stable chalcogenide complex, hydrolysis of orthotitanic acid, a method of forming semiconductor fine particles from a soluble portion and an insoluble portion, and then removing by dissolving the soluble portion, hydrothermal synthesis of an aqueous peroxide solution, and a method of producing titanium oxide fine particles having a core-shell structure according to a sol-gel method.

Examples of the crystal structure of titania include structures of anatase type, brookite type and rutile type, and anatase type and brookite type structures are preferred in the present invention.

It is also acceptable to mix a titania nanotube/nanowire/nanorod with the titania fine particles.

Titania may be doped with a non-metallic element or the like. In addition to the dopants, as additives used with titania, a binder for improving necking, or a surface additive for preventing reverse electron transfer may also be used. Preferred examples of the additives include ITO or SnO particles, whiskers, a fibrous graphite/carbon nanotube, a zinc oxide necking coupler, fibrous materials such as celluloses, metals, organosilicon, dodecyl benzenesulfonate, charge transfer coupling molecules of silane compounds or the like, and a potential gradient type dendrimer.

For the purpose of eliminating surface defects of titania, or the like, titania may be subjected to an acid base treatment or an oxidation reduction treatment before the adsorption of a dye. Furthermore, titania may also be subjected to etching, an oxidation treatment, a hydrogen peroxide treatment, a dehydrogenation treatment, UV-ozone, oxygen plasma or the like.

(D) Semiconductor Fine Particle Dispersion Liquid

Porous semiconductor fine particles-coated layer can be obtained by applying a semiconductor fine particle dispersion liquid in which the content of solids excluding semiconductor fine particles is 1% by mass or less of the total amount of the semiconductor fine particle dispersion liquid, on the electrically conductive support mentioned above, and appropriately heating the coated support.

Examples of the method of producing a semiconductor fine particle dispersion liquid include, in addition to the sol-gel method described above, a method of precipitating the semiconductor in the form of fine particles in a solvent upon synthesis and directly using the fine particles; a method of ultrasonicating fine particles, and thereby pulverizing the fine particles into ultrafine particles; a method of mechanically grinding a semiconductor using a mill or a mortar, and pulverizing the ground semiconductor; and the like. As a dispersion solvent, water and/or various organic solvents can be used. Examples of the organic solvent include alcohols such as methanol, ethanol, isopropyl alcohol, citronellol and terpineol; ketones such as acetone; esters such as ethyl acetate; dichloromethane, and acetonitrile.

At the time of dispersing the fine particles, for example, a polymer such as polyethylene glycol, hydroxyethylcellulose or carboxymethylcellulose; a surfactant, an acid or a chelating agent may be used in a small amount as a dispersing aid, as necessary. It is preferable that such a dispersing aid is mostly eliminated before the step of forming a film on the electrically conductive support, by a filtration method, a method of using a separating membrane, or a centrifugation method. The semiconductor fine particle dispersion liquid is such that the content of solids excluding semiconductor fine particles is 1% by mass or less based on the total amount of the dispersion liquid. This concentration is preferably 0.8% or less, further preferably 0.5% or less, and particularly preferably 0.3% or less. In other words, the semiconductor fine particle dispersion liquid may contain a solvent and solids excluding semiconductor fine particles in an amount of 1% by mass or less based on the total amount of the semiconductor fine particle dispersion liquid. In the present, it is preferable that the semiconductor fine particle dispersion liquid is substantially composed of semiconductor fine particles and a dispersion solvent.

If the viscosity of the semiconductor fine particle dispersion liquid is too high, the dispersion liquid undergoes aggregation, and film formation cannot be achieved. On the other hand, if the viscosity of the semiconductor fine particle dispersion liquid is too low, the liquid flows out, and film formation cannot be achieved in some cases. Therefore, the viscosity of the dispersion liquid is preferably 10 to 300 $N·s/m^2$ at 25° C., and more preferably 50 to 200 $N·s/m^2$ at 25° C.

In regard to the method of applying the semiconductor fine particle dispersion liquid, a roller method, a dipping method or the like can be used as a method involving application. Furthermore, an air knife method, a blade method or the like can be used as a method involving metering. As a method that can equally utilize a method involving application and a method involving metering, a wire bar method disclosed in JP-B-58-4589 ("JP-B" means examined Japanese patent publication), an extrusion method, a curtain method and a slide hopper method described in U.S. Pat. No. 2,681,294 and the like are preferred. It is also preferable to apply the dispersion liquid by a spinning method or a spray method, using a versatile machine. Preferred examples of a wet printing method include the three major printing methods of relief printing, offset printing and gravure printing, as well as intaglio printing, rubber plate printing, screen printing and the like. Among these, a preferable film forming method is selected in accordance with the liquid viscosity or the wet thickness. Furthermore, since the semiconductor fine particle dispersion liquid used in the present invention has high viscosity and has viscidity, the fine particle dispersion liquid often has a strong cohesive power, and may not have good affinity to the support upon coating. Under such circumstances, when surface cleaning and hydrophilization are carried out through a UV-ozone treatment, the affinity between the applied semiconductor fine particle dispersion liquid and the surface of the electrically conductive support increases, and thus it becomes easier to apply the semiconductor fine particle dispersion liquid.

The thickness of the entire semiconductor fine particle layer is preferably 0.1 to 100 μm, more preferably 1 to 30 μm, and even more preferably 2 to 25 μm. The amount of the coated semiconductor fine particles per square meter of the support is preferably 0.5 to 400 g, and more preferably 5 to 100 g.

The applied layer of semiconductor fine particles is subjected to a heating treatment, for the purpose of reinforcing the electronic contact between semiconductor fine particles and enhancing the adhesiveness of the semiconductor fine particles to the support, and also in order to dry the applied semiconductor fine particle dispersion liquid. The porous semiconductor fine particle layer can be formed by this heating treatment.

Furthermore, light energy can also be used in addition to the heating treatment. For example, when titanium oxide is used for the semiconductor fine particles, the surface may be activated by providing the light that is absorbed by the semiconductor fine particles, such as ultraviolet light, or only the surface of the semiconductor fine particles can be activated with a laser light or the like. When the semiconductor fine particles are irradiated with a light that is absorbed by the fine particles, the impurities adsorbed to the particle surfaces are decomposed as a result of activation of the particle surfaces, and a state preferable for the purpose described above can be attained. In the case of using the heating treatment and ultraviolet light in combination, the heating is carried out at a temperature of preferably 100° C. or more and 250° C. or less, more preferably 100° C. or more and 150° C. or less, while the semiconductor fine particles are irradiated with the light that is absorbed by the fine particles. As such, by inducing photoexcitation of the semiconductor fine particles, the impurities incorporated in the fine particle layer can be washed away by photodecomposition, and the physical bonding between the fine particles can be reinforced.

In addition to the processes of applying the semiconductor fine particle dispersion liquid on the electrically conductive support and subjecting the semiconductor fine particles to heating or light irradiation, other treatments may also be carried out. Preferred examples of such treatments include the passage of electric current, chemical treatment, and the like.

It is also acceptable to apply pressure after coating, and examples of the method of applying pressure include the methods described in JP-T-2003-500857 ("JP-T" means searched and published International patent publication) and the like. Examples of the light irradiation method include the methods described in JP-A-2001-357896 and the like. Examples of the methods utilizing plasma, microwaves or electric current include the methods described in JP-A-2002-353453 and the like. Examples of the chemical treatment include the methods described in JP-A-2001-357896 and the like.

The method of coating the semiconductor fine particles on the electrically conductive support is included in the above-described method, such as a method of applying a semiconductor fine particle dispersion liquid on an electrically conductive support; and a method of applying a precursor of the semiconductor fine particles on an electrically conductive support, hydrolyzing the precursor under the action of the moisture in air, and thereby obtaining a semiconductor fine particle film, as described in Japanese Patent No. 2664194.

Examples of the precursor include $(NH_4)_2TiF_6$, titanium peroxide, a metal alkoxide, a metal complex and an organic acid metal salt.

Examples thereof include a method of applying a slurry additionally containing a metal organic oxide (alkoxide or the like), and forming a semiconductor film by a heating treatment, a light treatment or the like; and a method of characterizing the pH of the slurry additionally containing an inorganic precursor, and the slurry, and the properties and state of the dispersed titania particles. These slurries may be added with a small amount of binder. Examples of the binder include celluloses, fluoropolymers, a crosslinked rubber, polybutyl titanate, and carboxymethylcellulose.

Examples of the technique related to the formation of a layer of semiconductor fine particles or a precursor layer thereof include a method of hydrophilizing the layer by a physical method using corona discharge, plasma, UV or the like; a chemical treatment based on an alkali or on polyethylene dioxythiophene and polystyrenesulfonic acid or the like; formation of an intermediate film for bonding of polyaniline or the like.

As the method of coating semiconductor fine particles on an electrically conductive support, (2) dry methods or (3) other methods may be used together with the (1) wet methods described above.

Preferred examples of the (2) dry methods include the methods described in JP-A-2000-231943 and the like.

Preferred examples of the (3) other methods include the methods described in JP-A-2002-134435 and the like.

Examples of the dry method include deposition, sputtering, an aerosol deposition method, and the like. Furthermore, the electrophoresis method and the electrocrystallization method may also be used.

Furthermore, a method of first preparing a coating film on a heat resistant base, and then transferring the film to a film made of plastic or the like, may be used. Preferably, a method of transferring a layer through EVA as described in JP-A-2002-184475; a method of forming a semiconductor layer and a conductive layer on a sacrificing base containing an inorganic salt that can be removed by ultraviolet rays or a water-based solvent, subsequently transferring the layers to an organic base, and removing the sacrificing base as described in JP-A-2003-98977; and the like may be used.

It is preferable for the semiconductor fine particles to have a large surface area, so that a large amount of dye can adsorb to the surface. For example, while the semiconductor fine particles have been coated on the support, the surface area is preferably 10 times or more, and more preferably 100 times or more, relative to the projected surface area. The upper limit of this value is not particularly limited, but the upper limit is usually about 5000 times. Preferred examples of the structure of the semiconductor fine particles include the structures disclosed in JP-A-2001-93591 and the like.

In general, as the thickness of the semiconductor fine particle layer increases, the amount of dye that can be supported per unit area increases, and therefore, the light absorption efficiency is increased. However, since the diffusion distance of generated electrons increases along, the loss due to charge recombination is also increased. Although a preferred thickness of the semiconductor fine particle layer may vary with the utility of the element, the thickness is typically 0.1 to 100 μm. In the case of using the photoelectric conversion element for a photoelectrochemical cell, the thickness of the semiconductor fine particle layer is preferably 1 to 50 μm, and more preferably 3 to 30 μm. The semiconductor fine particles may be calcined after being applied on the support, at a temperature of 100 to 800° C. for 10 minutes to 10 hours, so as to bring about cohesion of the particles. When a glass support is used, the film forming temperature is preferably 400 to 600° C.

When a polymer material is used as the support, it is preferable that the formed film is heated at 250° C. or less. The method of forming a film in this case may be any of (1) a wet method, (2) a dry method, and (3) an electrophoresis method (including an electrocrystallization method); preferably (1) a wet method or (2) a dry method; and further preferably (1) a wet method.

The amount of coating of the semiconductor fine particles per square meter of the support is preferably 0.5 to 500 g, and more preferably 5 to 100 g.

In order to adsorb a dye to semiconductor fine particles, it is preferable to immerse the formed semiconductor electrode in a dye solution for dye adsorption formed from a solvent and the dye for use in the present invention. In regard to the solvent that is used in the dye solution for dye adsorption, any solvent capable of dissolving the dye for use in the present invention can be used without any particular limitation. For example, ethanol, methanol, isopropanol, toluene, t-butanol, acetonitrile, acetone or n-butanol can be used. Among them, ethanol and toluene can be preferably used.

The dye solution for dye adsorption formed from a solvent and the dye for use in the present invention may be heated if necessary, at 50° C. to 100° C. Adsorption of the dye may be carried out before or after the process of applying the semiconductor fine particles. Adsorption of the dye may also be conducted by simultaneously applying the semiconductor fine particles and the dye. Any unadsorbed dye is removed by washing. In the case of performing calcination of the coating film, it is preferable to carry out the adsorption of the dye after calcination. After calcination has been performed, it is particularly preferable to perform the adsorption of the dye rapidly before water adsorbs to the surface of the coating film. The dye to be adsorbed may be composed of a single kind, or a mixture of plural kinds of dyes may also be used. In the case of mixing dyes, two or more kinds of dyes according for use in the present invention may be used. Alternatively, a complex dye and the dye for use in the present invention may be mixed, as long as the effects of the present invention are not impaired.

The dyes are selected so that the wavelength region for photoelectric conversion can be made as broad as possible when the dyes are mixed. In the case of using a mixture of dyes, it is required to prepare a dye solution for dye adsorption by dissolving all of the dyes used therein.

The overall amount of use of the dye is preferably 0.01 to 100 millimoles, more preferably 0.1 to 50 millimoles, and particularly preferably 0.1 to 10 millimoles, per square meter of the support. In this case, the amount of use of the dye for use in the present invention is preferably adjusted to 5% by mole or more.

The amount of the dye adsorbed to the semiconductor fine particles is preferably 0.001 to 1 millimole, and more preferably 0.1 to 0.5 millimoles, based on 1 g of the semiconductor fine particles.

When the amount of the dye is adjusted to such a range, the sensitization effect for the semiconductor can be sufficiently obtained. On the other hand, if the amount of the dye is too smaller, the sensitization effect is insufficient, and if the amount of the dye is excessive, the portion of the dye that is not attached to the semiconductor is suspended, and causes a decrease in the sensitization effect.

For the purpose of reducing the interaction between dye molecules such as association, a colorless compound may be co-adsorbed. Examples of the hydrophobic compound that is co-adsorbed include steroid compounds having a carboxyl group (for example, cholic acid and pivaloyl acid).

After the dye has been adsorbed, the surface of the semiconductor fine particles may be treated using amines. Preferred examples of the amines include 4-tert-butylpyridine, and polyvinylpyridine. These may be used directly when the compounds are liquids, or may be used in a state of being dissolved in an organic solvent.

The counter electrode is an electrode working as a positive electrode in the photoelectrochemical cell. The counter electrode usually has the same meaning as the electrically conductive support described above, but in a construction which is likely to maintain a sufficient strength, a support is not necessarily required. However, a construction having a support is advantageous in terms of sealability. Examples of the material for the counter electrode include platinum, carbon, and electrically conductive polymers. Preferred examples include platinum, carbon, and electrically conductive polymers.

A preferred structure of the counter electrode is a structure having a high charge collecting effect. Preferred examples thereof include those described in JP-T-10-505192 and the like.

In regard to the light-receiving electrode, a composite electrode of titanium oxide and tin oxide ($TiO_2/SnO_2$) or the like may be used. Examples of mixed electrodes of titania include those described in JP-A-2000-113913 and the like. Examples of mixed electrodes of materials other than titania include those described in JP-A-2001-185243, JP-A-2003-282164 and the like.

The light-receiving electrode may be a tandem type electrode so as to increase the utility ratio of the incident light, or the like. Preferred examples of the tandem type construction include those described in JP-A-2002-90989 and the like.

The light-receiving electrode may be provided with the photo management function by which light scattering and reflection are efficiently achieved inside the light-receiving electrode layer. Preferred examples thereof include those described in JP-A-2002-93476 and the like.

It is preferable to form a short circuit preventing layer between the electrically conductive support and the porous semiconductor fine particle layer, so as to prevent reverse current due to a direct contact between the electrolyte liquid and the electrode. Preferred examples thereof include those described in JP-T-6-507999 and the like.

It is preferable to employ a spacer or a separator so as to prevent the contact between the light-receiving electrode and the counter electrode. Preferred examples thereof include those described in JP-A-2001-283941 and the like.

EXAMPLES

The present invention will be described in more detail based on examples given below, but the invention is not meant to be limited by these.

1. Preparation of Dye

Dye A-1 was prepared according to the following method.

Was dissolved 8 mL (0.057 mol) of diisipropylamine in 16 mL of dry tetrahydrofurane (THF). To the resultant solution, 35.2 mL (0.056 mol) of n-butyllithiumhexane solution (concentration: 1.6 mol/L) was added dropwise while keeping the reaction liquid at 0° C. under a nitrogen atmosphere, and then stirred at 0° C. for 20 minutes to prepare LDA. To the reaction liquid, a solution in which 4.0 g (0.0217 mol) of 4,4'-dimethylbipyridine 1 has been dissolved in 80 mL of dry THF was added dropwise while keeping the reaction liquid at 0° C., and then stirred at 0° C. for 75 minutes. Next, a solution in which 7.64 g (0.432 mol) of aldehyde 2 has been dissolved in 80 mL of dry THF was added dropwise while keeping the reaction liquid at 0° C., and then stirred at 0° C. for 75 minutes and at room temperature for 5 hours. To the obtained solution, 8 mL of methanol was added and subsequently 80 ml of water was added, and then the precipitated crystals were separated by filtration and washed, and then recrystallized from benzene, thereby obtaining 6.3 g of crystal of alcohol 3 (yield: 66%).

Was dissolved 6.76 g (14 mmol) of alcohol 3 in 170 mL of a 10% sulfuric acid aqueous solution, and then stirred at 90° C. for 2 hours. The aqueous solution was cooled, and then neutralized with a sodium hydroxide aqueous solution (concentration: 1 mol/L), and then extracted with methylene chloride three times, followed by washing. The obtained methylene chloride solution was dried with magnesium sulfate, and then concentrated. The concentrate was dispersed in a methylene chloride-methanol mixed solvent and separated by filtration, thereby obtaining 5.3 g of yellow crystal of bis (diethylaminostyryl)bipyridine 4.

Were dissolved 0.97 g (2 mmol) of ruthenium complex 5 and 0.9 g of bis (diethylaminostyryl) bipyridine 4 in 20 mL of chloroform and refluxed for 4 hours. After concentration under reduced pressure, an acetone-diethylether mixed solution was added to the concentrate. The produced crystal was separated by filtration and washed with ether, thereby obtaining 1.54 g of ruthenium complex 6 (yield: 99%). Note that ruthenium complex 5 was synthesized with reference to a method described in J. Chem. Soc., Dalton, 1973, 204.

Were dissolved 0.155 g (0.2 mmol) of ruthenium complex 6 and 0.0324 g (0.4 mmol) of sodium thiocyanate in a mixed solution of DMF (30 mL) and water (10 mL) and refluxed for 2 hours in a dark place under nitrogen atmosphere. Next, to the resultant reaction liquid, 0.045 g (0.2 mmol) of bipyridine-4,4'-dicarboxylic acid 7 was added and refluxed for 6 hours. The obtained solution was concentrated, and then dispersed in methanol, and then separated by filtration, thereby obtaining 0.046 g of crystal of metal complex dye A-1. Note that the structure of the target was spectrally confirmed using NMR.

The other dyes used in the experimentation were prepared in the same manner as dye A-1.

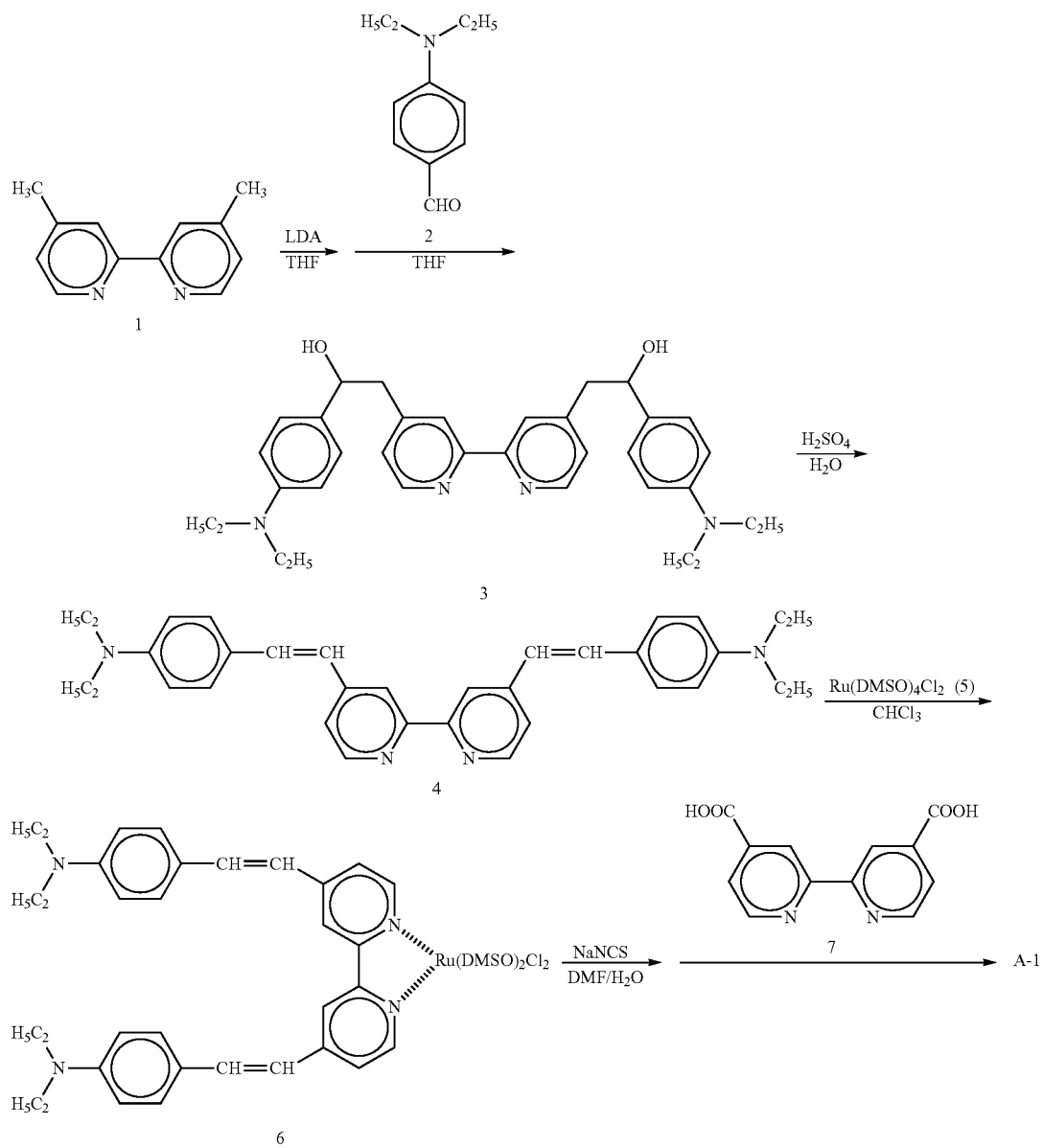

2. Measurement of Maximum Absorption Wavelength of Dyes

The maximum absorption wavelengths of the above-described dyes were measured. With respect to the comparative dye R, the maximum absorption wavelengths of the dye described below was measured. The measurement was conducted using a spectrophotometer U-4100 (trade name, manufactured by Hitachi High-Technologies Corp.). A mixed solution consisting of ethanol or tetrahydrofurane and water (a ratio by mass 70:30) was used as a solution.

TABLE 1

| Dye | Maximum absorption wavelength (nm) |
|---|---|
| A-1 | 425, 550 |
| A-2 | 425, 550 |
| A-4 | 425, 550 |

TABLE 1-continued

| Dye | Maximum absorption wavelength (nm) |
|---|---|
| A-6 | 425, 550 |
| A-12 | 400, 560 |
| A-13 | 370, 565 |
| A-14 | 370, 565 |
| A-15 | 370, 565 |
| Comparative Dye R | 520 |

(Experiment I)

A photoelectrochemical cell was produced according to the method described below, and the cell was evaluated. The results are presented in Table 2.

(1) Production of Transparent Electrically Conductive Support

Fluorine-doped tin dioxide was uniformly applied by a CVD method over the entire surface of an alkali-free glass substrate having a thickness of 1.9 mm, and thus a transparent electrically conductive support coated on one side with a conductive tin dioxide film having a thickness of 600 nm, a surface resistance of about 15 Ω/cm² and a light transmittance at 500 nm of 85%, was formed.

(2) Preparation of Semiconductor Fine Particles

The following three kinds of semiconductor fine particles a, b and c were prepared.

(i) Semiconductor Fine Particles a

A dispersion liquid of anatase type titanium dioxide containing titanium dioxide at a concentration of 11% by mass was synthesized according to the production method described in C. J. Barbe et al., J. Am. Ceramic Soc., Vol. 80, p. 3157, using titanium tetraisopropoxide as a titanium raw material and setting the temperature of the polymerization reaction in an autoclave at 230° C. The size of the primary particles of the obtained titanium dioxide particles was 10 to 30 nm. The obtained dispersion liquid was subjected to an ultracentrifuge to separate the particles, and the aggregates were dried. Subsequently, the aggregates were pulverized in an agate mortar, and thus semiconductor fine particles a were obtained as white powder.

(ii) Semiconductor Fine Particles b

P-25 (trade name) manufactured by Nippon Aerosil Co., Ltd. was used. P-25 is titanium oxide fine particles having a primary particle size of 20 nm, a BET specific surface area of 50 m²/g, and an anatase content ratio of 77%, produced by a method involving calcination in a gas phase.

(iii) Semiconductor Fine Particles c

Anatase type titanium oxide (anatase content ratio of 99%) manufactured by Aldrich Company was used.

(3) Production of Porous Semiconductor Fine Particle Layer

The semiconductor fine particles a, b and c prepared in the above item (2) were each added to 100 mL of a mixed solvent formed from water and acetonitrile at a volume ratio of 4:1, at a concentration of 32 g per 100 mL of the solvent, and the mixtures were uniformly dispersed and mixed using a mixing conditioner of rotation/revolution combination type. As a result, in the case of the semiconductor fine particles a and b, the obtained white semiconductor fine particle dispersion liquids became highly viscous pastes having viscosities of 50 to 150 N·s/m², and it was found that these pastes had liquid properties adequate to be used directly in the coating. However, in the case of the semiconductor fine particles c, the semiconductor fine particle dispersion liquid had a low viscosity, and a coating film having a constant thickness could not be obtained.

There, the dispersion liquids obtained by using the semiconductor fine particles a and b were each applied on the transparent electrically conductive support coated with an electrically conductive tin dioxide film produced in the above item (1), using an applicator, and the dispersion liquid was dried at room temperature for one hour. Thereby, a coating layer having a uniform thickness of 40 to 70 µm was formed. This coating layer was further dried for 30 minutes at 120° C., and then was exposed to UV light for 30 minutes from a mercury lamp ultraviolet light source of 100 W, followed by a post-treatment. As such, a porous semiconductor fine particle layer for dye sensitization was produced. The final average thickness of the porous semiconductor fine particle layer was 6.5 µm for the substrate a which used the semiconductor fine particles a, and 6.2 µm for the substrate b which used the semiconductor fine particles b.

In order to investigate the weight of the content of solids excluding the semiconductor fine particles contained in the dispersion liquid, the semiconductor fine particle layer was heated in air at 350° C. for 0.5 hours, and the weight change before and after the heating was measured. As a result, the weight decrease per unit area of Examples 1 to 6 and 8 to 10 and Comparative Example 1, in which the dispersion liquids did not contain any solids other than the semiconductor fine particle layers a and b, was 0.3 mass % in all cases. In Example 7 and Comparative Example 2, a powder of polyethylene glycol (PEG) having weight-average molecular weight of 500,000 was added to a dispersion liquid respectively so that the content of solids excluding semiconductor fine particles were adjusted to 0.8% and 1.2%, respectively, with respect to the total of the semiconductor fine particle dispersion liquid.

(4) Preparation of Solution for Dye Adsorption

The dyes described in the Table 1 given below each were dissolved in dry ethanol to obtain a concentration of $3 \times 10^{-4}$ moles/liter, and thus a solution for dye adsorption was obtained.

Further, the Comparative Dye R (dye described in JP-A-2002-280587) described in Table 1 given below was dissolved in a mixed solvent of dry acetonitrile:t-butanol:ethanol at a volume ratio of 2:1:1, to obtain a dye concentration of $3 \times 10^{-4}$ moles/liter. In this dye solution, an organic sulfonic acid derivative having a structure of p-$C_9H_{19}$—$C_6H_4$—O—($CH_2CH_2$—O)$_3$—($CH_2$)$_4$—$SO_3$Na was dissolved as an additive to obtain a concentration of 0.025 moles/liter, and thus a solution for dye adsorption was prepared.

(5) Adsorption of Dye

The substrates a and b each coated with a porous semiconductor fine particle layer were immersed in the dye solution for adsorption described above, and were left immersed under stirring for 3 hours at 40° C.

The dye in a proper amount was adsorbed to the semiconductor fine particle layers as such, and thus porous semiconductor fine particle layer was prepared.

(6) Production of Photoelectrochemical Cell

A dye-adsorbed porous semiconductor fine particle layer was subjected to finishing, and thereby a circular photosensitive electrode having a light-receiving area of 1.0 cm² (diameter about 1.1 cm) was formed. A platinum-deposited glass substrate as a counter electrode was superposed against the photosensitive electrode, with a frame type spacer (thickness 20 µm) produced from a thermally pressed polyethylene film inserted between the electrodes. The spacer areas were heated to 120° C., and the two substrates were pressed. Furthermore, the edge areas of the cell were sealed with an epoxy resin adhesive.

A room temperature molten salt having formed from a composition of 1,2-dimethyl-3-propylimidazolium iodide/iodine=50:1 (mass ratio) as an electrolyte liquid was introduced through a small hole for electrolyte liquid injection preliminarily prepared at a corner area of the substrate of the counter electrode, and was infiltrated into the space between the electrodes from the small hole of the substrate, by utilizing the capillary phenomenon.

The process of cell construction and the process of electrolyte liquid injection described above were all carried out in dry air having a dew point of −60° C. as described above. After the injection of the molten salt, the cell was suctioned in a vacuum for several hours, and degassing of the inside of the cell containing the photosensitive electrode and the molten salt was performed. Finally, the small hole was sealed with low melting point glass. Thereby, a photoelectrochemical cell in which an electrically conductive support, a photosensitive layer adsorbed with a dye, a charge transfer layer and a counter electrode were laminated in this sequence, was produced.

(7) Measurement of Photoelectric Conversion Efficiency

With respect to each photoelectrochemical cell produced in Examples 1 to 10 and Comparative Examples 1 to 2, measurement of photoelectric conversion efficiency was conducted.

A xenon lamp of 500 W power (manufactured by Ushio, Inc.) was mounted with a correction filter for sunlight simulation (trade name: AM1.5 direct, manufactured by LOT-Oriel AG), and the photoelectrochemical cell was irradiated with a pseudo-sunlight having an incident light intensity of 100 mW/cm$^2$, from the side of the porous semiconductor fine particle electrode (photosensitive electrode).

The photoelectrochemical cell was fixed closely on the stage of a thermostat, and the temperature during irradiation was controlled to 50° C. The photocurrent-voltage characteristics were measured by scanning the DC voltage applied to the device using a current voltage analyzer (Source Measure Unit Model 238, manufactured by Keithley Instruments, Inc.) at a constant rate of 10 mV/sec, and thereby measuring the photocurrent outputted by the cell. The energy conversion efficiencies determined thereby are described in Table 2, together with the contents of the constituent elements of the cells (semiconductor fine particles, dye, and the content of solids excluding the semiconductor fine particles in the dispersion liquid). Further, rate of decrease in conversion efficiency after light irradiation for 24 consecutive hours was also measured. The results of this measurement are shown together in Table 2. The photoelectrochemical cell is deemed to pass the durability test when it exhibit performances such that the initial value of conversion efficiency is 2.5% or more and the rate of decrease in conversion efficiency is 8% or less.

present invention thereon, photoelectrochemical cells that have reach an acceptable level in terms of higher conversion efficiency are obtained (Examples 1 to 10), as compared with the case of adsorbing the Comparative Dye R on the porous semiconductor fine particle layer under the same conditions as the above (Comparative Example 1).

In contrast, in the case of using the dye for use in the present invention, and producing a porous semiconductor fine particle layer by applying, on a support, a particle dispersion liquid in which the content of solids excluding semiconductor fine particles is more than 1% by mass of the dispersion liquid, heating the dispersion liquid coating, and adsorbing the dye thereon, it is found that the conversion efficiency is low and the conversion efficiency after continuous irradiation is more than 30%, which have a problem with durability.
(Experiment II)

A photoelectrochemical cell was produced according to the method described below, and the cell was evaluated.
(1) Production of Transparent Electrically Conductive Support As a support for photosensitive electrode, a flexible transparent electrically conductive support obtained by uniformly

TABLE 2

| | Condition for producing photoelectrochemical cell | | | Cell performance | |
|---|---|---|---|---|---|
| | Semiconductor fine particles | Dye | Content of solids excluding semiconductor fine particles in dispersion liquid (%) | Conversion efficiency (%) | Rate of decrease in conversion efficiency after consecutive light irradiation (%) |
| Example 1 | a | A-1 | 0.3 | 4.0 | 5 |
| Example 2 | a | A-2 | 0.3 | 3.7 | 6 |
| Example 3 | a | A-6 | 0.3 | 3.8 | 5 |
| Example 4 | a | A-13 | 0.3 | 3.9 | 7 |
| Example 5 | a | A-14 | 0.3 | 3.9 | 5 |
| Example 6 | a | A-15 | 0.3 | 4.1 | 5 |
| Example 7 | a | A-15 | 0.8 | 3.1 | 6 |
| Example 8 | b | A-1 | 0.3 | 3.8 | 6 |
| Example 9 | b | A-4 | 0.3 | 3.9 | 7 |
| Example 10 | b | A-15 | 0.3 | 3.9 | 4 |
| Comparative Example 1 | a | R | 0.3 | 2.9 | 42 |
| Comparative Example 2 | a | A-1 | 1.2 | 0.7 | 34 |

Comparative Dye R (Compound described in JP-A-2002-280587)

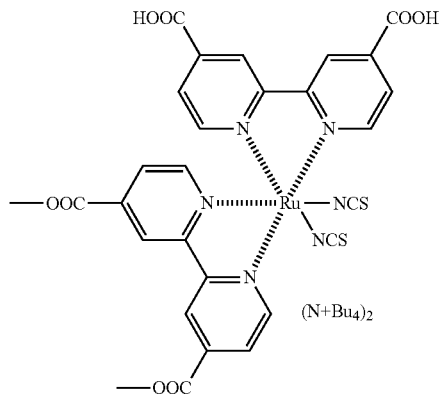

From the results of Table 2, it is found that in the case of producing a porous semiconductor fine particle layer by applying, on a support, a particle dispersion liquid in which the content of solids excluding semiconductor fine particles is 1% by mass or less of the dispersion liquid, and heating the dispersion liquid coating, and adsorbing the dye for use in the applying a conductive thin film of tin oxide to a thickness of 200 nm, on one surface of a sheet having a thickness of 0.4 mm and having the surfaces coated with fluorine, was used.
(2) Production of Conductive Sheet for Counter Electrode A platinum film having a thickness of 300 nm was uniformly coated by a vacuum sputtering method, on one surface of a Kapton (registered trademark) film made of polyimide and having a thickness of 0.4 mm. The surface resistance was 5 Ω/cm$^2$.
(3) Preparation of Semiconductor Fine Particle Dispersion Liquid A semiconductor fine particle dispersion liquid was prepared using the semiconductor fine particles a used in Experiment 1. In Example 115 and Comparative Example 105, the content of solids excluding semiconductor fine particles in the whole of the semiconductor fine particle dispersion liquid was adjusted by adding a powder of polyethylene glycol (PEG) having a weight-average molecular weight of 500,000, to the dispersion liquid. In the other semiconductor fine particle dispersion liquids, no solids excluding semiconductor fine particles were added.
(4) Measurement of Solids in Semiconductor Fine Particle Dispersion Liquid Each of the dispersion liquids was applied to a thickness of 40 to 70 μm, on an alkali-free glass substrate having a thickness of 1.9 mm, using an applicator, and the dispersion liquid coating was dried for one hour at room temperature. Subsequently, the assembly was heated in air at 350° C. for 0.5 hours, and the weight change before and after the heating was measured. The contents of solids excluding the semiconductor fine particles of the semiconductor fine particle dispersion used in Example 115 and Comparative Example were 1.0% and 1.2%, respectively. The contents of solids excluding the semiconductor fine particles in the other samples were all 0.3%.

(5) Preparation of Semiconductor Fine Particle Layer

The dispersion liquid prepared in the above item (3) was applied on the transparent electrically conductive support prepared in the above item (1), using an applicator, and the dispersion liquid coating was dried one hour at room temperature. Thereby, a uniform coating layer having a thickness of 40 to 70 μm was formed. This resultant coating layer was further treated under the conditions of thermal treatment/UV treatment after coating described in Table 2 to produce a porous semiconductor fine particle layer for dye sensitization. That is, the treatment was conducted under the specific conditions such that the coating layer was dried at respective temperature for 30 minutes, and then exposed to UV light from a mercury lamp ultraviolet light source of 100 W for 30 minutes. The final average thickness of the porous semiconductor fine particle layer was 6 to 7 μm in all cases.

(6) Adsorption of Dye

The support having a porous semiconductor fine particle layer formed thereon was immersed in a dye solution for adsorption prepared in the same manner as in Experiment 1, and the support was left immersed under stirring for 3 hours at 40° C.

The dye in a proper amount was adsorbed to the semiconductor fine particle layer as such, and thereby a porous semiconductor fine particle layer was produced.

(7) Production of Photoelectrochemical Cell

The photoelectrochemical cell was produced in the same manner as Experiment 1, using the porous semiconductor fine particle layer obtained in the above item (5).

(8) Measurement of Photoelectric Conversion Efficiency

Measurement of photoelectric conversion efficiency was conducted with respect to each photoelectrochemical cell produced in Examples 101 to 118 and Comparative Examples 101 to 105. Both conversion efficiency and rate of reduction in conversion efficiency after light irradiation for 24 consecutive hours were measured in the same manner as Experiment 1. The results are shown in Table 3. The photoelectrochemical cell is deemed to pass the durability test when it exhibit performances such that the initial value of conversion efficiency is 2.5% or more and the rate of decrease in conversion efficiency is 8% or less.

TABLE 3

| | Condition for producing photoelectrochemical cell | | | | Cell performance | |
|---|---|---|---|---|---|---|
| | Semiconductor fine particles | Electrically conductive support | Dye | Content of solids excluding semiconductor fine particles in dispersion liquid | Heat treatment after coating/ UV treatment | Conversion efficiency (%) | Rate of decrease in conversion efficiency after consecutive light irradiation (%) |
| Ex 101 | a | PEN | A-1 | 0.3 | 120° C./UV treatment | 3.7 | 5 |
| Ex 102 | a | PEN | A-4 | 0.3 | 120° C./UV treatment | 3.8 | 4 |
| Ex 103 | a | PEN | A-12 | 0.3 | 120° C./UV treatment | 3.7 | 5 |
| Ex 104 | a | PC | A-14 | 0.3 | 120° C./No UV treatment | 3.6 | 4 |
| Ex 105 | a | PEN | A-14 | 0.3 | 120° C./No UV treatment | 3.8 | 4 |
| Ex 106 | a | PC | A-4 | 0.3 | 90° C./UV treatment | 2.5 | 6 |
| Ex 107 | a | PEN | A-12 | 0.3 | 90° C./UV treatment | 2.7 | 8 |
| Ex 108 | a | PEN | A-14 | 0.3 | 90° C./UV treatment | 2.6 | 7 |
| Ex 109 | a | PEN | A-4 | 0.3 | 150° C./UV treatment | 3.9 | 5 |
| Ex 110 | a | PEN | A-12 | 0.3 | 150° C./UV treatment | 3.7 | 4 |
| Ex 111 | a | PEN | A-14 | 0.3 | 150° C./UV treatment | 3.8 | 4 |
| Ex 112 | a | PEN | A-4 | 0.3 | 200° C./UV treatment | 2.7 | 5 |
| Ex 113 | a | PEN | A-12 | 0.3 | 200° C./UV treatment | 2.8 | 4 |
| Ex 114 | a | PEI | A-14 | 0.3 | 200° C./UV treatment | 2.9 | 5 |
| Ex 115 | a | PEN | A-15 | 1.0 | 120° C./UV treatment | 3.0 | 9 |
| Ex 116 | a | PEN | A-17 | 0.3 | 120° C./UV treatment | 3.4 | 7 |
| Ex 117 | a | PEN | A-19 | 0.3 | 120° C./UV treatment | 3.7 | 4 |
| Ex 118 | a | PEN | A-20 | 0.3 | 120° C./UV treatment | 3.6 | 6 |
| C Ex 101 | a | PEN | R | 0.3 | 120° C./UV treatment | 2.6 | 48 |
| C Ex 102 | a | PC | R | 0.3 | 90° C./UV treatment | 1.8 | 56 |
| C Ex 103 | a | PEN | R | 0.3 | 150° C./UV treatment | 2.6 | 48 |
| C Ex 104 | a | PEN | R | 0.3 | 200° C./UV treatment | 1.9 | 50 |
| C Ex 105 | a | PEN | A-1 | 1.2 | 120° C./UV treatment | 0.3 | 67 |

"Ex" means Example according to the present invention.
"C Ex" means Comparative Example.

As shown in Table 3, it is found that in the case of producing a porous semiconductor fine particle layer by applying, on a support, a particle dispersion liquid in which the content of solids excluding semiconductor fine particles is 1% by mass or less of the dispersion liquid, heating the dispersion liquid coating, and then adsorbing the dye for use in the present invention thereon, photoelectrochemical cells that have reached an acceptable level especially in terms of more improvement in the rate of reduction in conversion efficiency after light irradiation for 24 consecutive hours are obtained (Examples 101 to 118), as compared with the case of adsorbing the Comparative Dye R on the porous semiconductor fine particle layer under the same conditions as the above (Comparative Examples 101 to 104).

In contrast, the photoelectrochemical cell produced by a method of using the dye for use in the present invention and producing a porous semiconductor fine particle layer by applying, on a support, a particle dispersion liquid in which the content of solids excluding semiconductor fine particles is more than 1% by mass of the dispersion liquid, heating the dispersion liquid coating, and then adsorbing the dye for use in the present invention thereon, did not reach an acceptable level in the respective terms of initial value of conversion efficiency and rate of reduction in conversion efficiency after light irradiation for 24 consecutive hours (Comparative Example 105).

Further in the case of using a support made of an electrically conductive polymer and producing a porous semiconductor fine particle layer by applying, on the support, a particle dispersion liquid, in which the content of solids excluding semiconductor fine particles is 1% by mass or less of the dispersion liquid, heating the dispersion liquid coating, and then adsorbing the dye for use in the present invention thereon, photoelectrochemical cells having reached an acceptable level in the respective terms of conversion efficiency and rate of reduction in conversion efficiency after light irradiation for 24 consecutive hours was obtained (Examples 101 to 118). Especially, in the case of producing a porous semiconductor fine particle layer by applying, on the support, a particle dispersion liquid, in which the content of solids excluding semiconductor fine particles is 0.3% by mass of the dispersion liquid, followed by a heat treatment in the range of 120 to 150° C., and then adsorbing the dye for use in the present invention thereon, the photoelectric conversion efficiency increased by 3% or more (Examples 101 to 105, 109 to 111, and 115 to 118).

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2010-068946 filed in Japan on Mar. 24, 2010, which is entirely herein incorporated by reference.

REFERENCE SIGNS LIST

1 Electrically conductive support
2 Photosensitive layer
21 Dye compound
22 Porous semiconductor fine particle
23 Electrolyte
3 Hole transfer layer
4 Counter electrode
5 Light-receiving electrode
6 Circuit
10 Photoelectric conversion element

The invention claimed is:
1. A method of producing a photoelectric conversion element, which comprises a laminated structure including:
an electrically conductive support;
a photosensitive layer having semiconductor fine particles that have adsorbed a dye, formed on the electrically conductive support;
a charge transfer layer; and
a counter electrode;
comprising the steps of:
applying a semiconductor fine particle dispersion liquid, in which the content of solids excluding semiconductor fine particles is 1% by mass or less based on the total amount of the semiconductor fine particle dispersion liquid, on the electrically conductive support, to form a coating;
heating the coating, to obtain porous semiconductor fine particles; and
sensitizing the porous semiconductor fine particles by a dye having a structure represented by Formula (1):

$$M(LL^1)m_1(LL^2)m_2(X)m_3 \cdot CI \qquad \text{Formula (1)}$$

wherein
M represents a metal atom; $LL^2$ is a bidentate or terdentate ligand represented by Formula (3);
X represents a monodentate or bidentate ligand which coordinates through a group selected from the group consisting of an acyloxy group, an acylthio group, a thioacyloxy group, a thioacylthio group, an acylaminooxy group, a thiocarbamate group, a dithiocarbamate group, a thiocarbonate group, a dithiocarbonate group, a trithiocarbonate group, an acyl group, a thiocyanate group, an isothiocyanate group, a cyanate group, an isocyanate group, a cyano group, an alkylthio group, an arylthio group, an alkoxy group and an aryloxy group, or a monodentate or bidentate ligand composed of a halogen atom, a carbonyl, a dialkylketone, a 1,3-diketone, a carbonamide, a thiocarbonamide or a thiourea;
$m_1$ represents an integer of 1 to 3; when $m_1$ is an integer of 2 or more, $LL^1$'s may be the same or different from each other; $m_2$ represents an integer of 0 to 2; when $m_2$ is an integer of 2, $LL^2$'s may be the same or different from each other; $m_3$ represents an integer of 0 to 2; when $m_3$ is an integer of 2, X's may be the same or different from each other, or X's may be bonded to each other;
CI represents a counter ion in the case where the counter ion is necessary to neutralize a charge in Formula (1); and

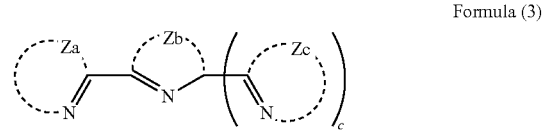

Formula (3)

wherein
Za, Zb and Zc each independently represent a group of non-metallic atoms for forming a 5- or 6-membered ring; and c represents 0 or 1; and
wherein, in Formula (1), $LL^1$ is represented by Formula (4):

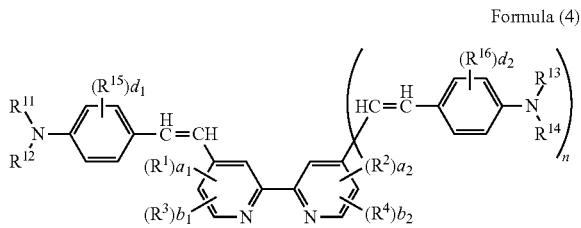

Formula (4)

wherein, in Formula (4), $R^1$ to $R^4$, $a_1$, $a_2$, $b_1$, $b_2$ and n have the same meaning as those in Formula (2); $R^{11}$ to $R^{14}$ each independently represent a hydrogen atom, an alkyl group, an alkenyl group, or an aryl group; when $R^{11}$ to $R^{14}$ are an alkyl group, additionally the alkyl group may have a substituent; $R^{11}$ and $R^{12}$, and $R^{13}$ and $R^{14}$ may be each bonded with each other to form a ring; $R^{15}$ and $R^{16}$ each independently represent a substituent; $d1$ and $d_2$ each independently represent an integer of 0 to 4; when $d_1$ is 1 or more, $R^{15}$ may be bonded with $R^{11}$ and/or $R^{12}$ to form a ring; when $d_1$ is 2 or more, $R^{15}$'S may be the same or different from each other, or may be bonded with each other to form a ring; when $d_2$ is 1 or more, $R^{16}$ may be bonded with $R^{13}$ and/or $R_{14}$ to form a ring; and when $d_2$ is 2 or more, $R^{16}$'S may be the same or different from each other, or may be bonded with each other to form a ring.

2. The method of producing a photoelectric conversion element according to claim 1, wherein the electrically conductive support is formed of a polymeric material.

3. The method of producing a photoelectric conversion element according to claim 1, wherein the electrically conductive support applied with the semiconductor fine particle dispersion liquid is heated at a temperature ranging from 100° C. to 250° C. in the step for obtaining the porous semiconductor fine particles.

4. The method of producing a photoelectric conversion element according to claim 1, wherein M is Ru, Fe, Os or Cu.

5. The method of producing a photoelectric conversion element according to claim 1, wherein M is Ru.

6. The method of producing a photoelectric conversion element according to claim 1, wherein the content of solids excluding semiconductor fine particles is 0.3% by mass or less based on the total amount of the semiconductor fine particle dispersion liquid.

7. The method of producing a photoelectric conversion element according to claim 1, wherein the electrically conductive support applied with the semiconductor fine particle dispersion liquid is heated at a temperature ranging from 120° C. to 150° C. in the step for obtaining the porous semiconductor fine particles.

8. The method of producing a photoelectric conversion element according to claim 1, wherein, in formula (4), n is 1.

9. The method of producing a photoelectric conversion element according to claim 1, wherein, in formula (4), $a_1$ is 0, $a_2$ is 0, $b_1$ is 0, and $b_2$ is 0.

10. The method of producing a photoelectric conversion element according to claim 1, wherein the ligand represented by formula (3) is a ligand L-5 described below

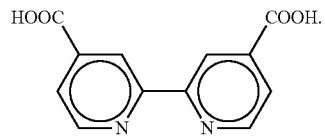

11. The method of producing a photoelectric conversion element according to claim 1, wherein the ligand represented by X in formula (1) is an isothiocyanate group.

12. The method of producing a photoelectric conversion element according to claim 1, wherein the counter ion represented by CI in formula (1) is a tetraalkyl ammonium ion or a proton.

13. The method of producing a photoelectric conversion element according to claim 1, wherein, in formula (1), $m_1$ is 1, $m_2$ is 1, and $m_3$ is 1 or 2.

14. A photoelectric conversion element, which is produced by the method according to claim 1.

15. A photoelectrochemical cell, comprising the photoelectric conversion element according to claim 14.

16. The method of producing a photoelectric conversion element according to claim 1, wherein the content of solids excluding semiconductor fine particles is 0.3 to 1% by mass based on the total amount of the semiconductor fine particle dispersion liquid.

17. The method of producing a photoelectric conversion element according to claim 1, wherein the step of heating the coating, to obtain porous semiconductor fine particles, further comprises a UV treatment.

* * * * *